(12) United States Patent
Yilmaz et al.

(10) Patent No.: US 10,003,388 B2
(45) Date of Patent: Jun. 19, 2018

(54) METHOD AND APPARATUS FOR INTERNAL RELATIVE TRANSCEIVER CALIBRATION

(71) Applicant: NTT DOCOMO, INC., Palo Alto, CA (US)

(72) Inventors: Ozgun Bursalioglu Yilmaz, Palo Alto, CA (US); Haralabos Papadopoulos, San Jose, CA (US); Giuseppe Caire, South Pasadena, CA (US)

(73) Assignee: NTT DOCOMO, INC., Tokyo (JP)

(*) Notice: Subject to any disclaimer, the term of this patent is extended or adjusted under 35 U.S.C. 154(b) by 0 days. days.

(21) Appl. No.: 14/425,305

(22) PCT Filed: Mar. 15, 2013

(86) PCT No.: PCT/US2013/032299
§ 371 (c)(1),
(2) Date: Mar. 2, 2015

(87) PCT Pub. No.: WO2014/039098
PCT Pub. Date: Mar. 13, 2014

(65) Prior Publication Data
US 2015/0222336 A1 Aug. 6, 2015

Related U.S. Application Data

(60) Provisional application No. 61/696,648, filed on Sep. 4, 2012.

(51) Int. Cl.
H04B 17/12 (2015.01)
H04B 17/14 (2015.01)
(Continued)

(52) U.S. Cl.
CPC ........... H04B 7/0452 (2013.01); H04B 7/024 (2013.01); H04B 17/11 (2015.01); H04B 17/21 (2015.01);
(Continued)

(58) Field of Classification Search
CPC ......... G01S 19/23; G01S 19/53; H04B 17/12; H04B 17/21
See application file for complete search history.

(56) References Cited

U.S. PATENT DOCUMENTS 6,615,024 B1 * 9/2003 Boros et al. ............... 455/67.14
8,009,095 B2 * 8/2011 Schlee ................... H01Q 3/267
342/368

(Continued)

FOREIGN PATENT DOCUMENTS

WO 2011/074031 6/2011
WO 2011/122083 10/2011
WO 2011/122167 10/2011

OTHER PUBLICATIONS

Shepard, Clayton, et al., "Argos: Practical Many-Antenna Base Stations", MobiCom '12, Aug. 22-26, 2012, Istanbul, Turkey, 12 pages.

(Continued)

Primary Examiner — Ayaz Sheikh
Assistant Examiner — Debebe Asefa
(74) Attorney, Agent, or Firm — Womble Bond Dickinson (US) LLP

(57) ABSTRACT

A method and apparatus is disclosed herein for internal relative transceiver calibration. In one embodiment, the method comprises generating a plurality of processed observations corresponding to pilots transmitted by transceiver units in the entity and observations of the pilots by transceiver units in the entity, each processed observation being indicative of a combined response of a pilot transmitted by transmitter hardware of one transceiver unit at the entity and an observation of the pilot by receiver hardware of another transceiver unit at the entity; grouping the plurality of processed observations into one or more observation pairs, where each observation pair of the one or more observation pairs comprises: a first observation indicative of a combined response between transmitter hardware of a first transceiver unit and receiver hardware of a second transceiver unit in the entity, and a second observation indicative of a combined response between transmitter hardware of the second trans- (Continued)

ceiver unit and receiver hardware of the first transceiver unit in the entity; and calculating, based on at least one of observation pairs, relative calibration values, where each relative calibration value is associated with a transceiver of each transceiver unit and is relative with respect to a transceiver of a reference unit at the entity.

47 Claims, 19 Drawing Sheets

(51) Int. Cl.
    *H04B 7/0413* (2017.01)
    *H04B 7/0452* (2017.01)
    *H01Q 3/26* (2006.01)
    *H04B 17/11* (2015.01)
    *H04B 17/21* (2015.01)
    *H04B 7/024* (2017.01)

(52) U.S. Cl.
    CPC ............ *H01Q 3/26* (2013.01); *H04B 7/0413* (2013.01); *H04B 17/12* (2015.01); *H04B 17/14* (2015.01)

(56) References Cited

U.S. PATENT DOCUMENTS

| | | | | |
|---|---|---|---|---|
| 8,064,502 | B2 * | 11/2011 | Sawai | H04B 17/21 375/219 |
| 8,559,571 | B2 * | 10/2013 | Tung | H04B 7/0413 375/346 |
| 9,300,382 | B2 * | 3/2016 | Aoki | H04B 7/0617 |
| 2010/0111864 | A1 | 5/2010 | Ametamey et al. | |

OTHER PUBLICATIONS

Huh, Hoon, et al., "Achieving 'Massive MIMO' Spectral Efficiency with a Not-so-Large Number of Antennas", IEEE Transactions on Wireless Communication, vol. 11, Issue 9, Sep. 2012, pp. 3226-3239.
Balan, Horia Vlad, et al., "Achieving High Data Rates in a Distributed MIMO System", MobiCom '12, Aug. 22-26, 2012, Istanbul, Turkey, 12 pages.
Hjorungnes, Are, et al., "Complex-valued matrix differentiation: Techniques and key results", IEEE Transactions on Signal Processing, vol. 55, Issue 6, Jun. 2007, pp. 2740-2746.
Mitsubishi Electric, Discussion on antenna calibration in TDD, 3GPP TSP-RAN WG1#56 R1-090563, 2009.
Ryan Rogalin et al., Hardware-Impairment Compensation for Enabling Distributed Large-Scale MIMO, Information Theory and Applications Workshop (ITA), 2013.
PCT Notification concerning Transmittal of International Preliminary Report on Patentability (Chapter I of the Patent Cooperation Treaty) for PCT Counterpart Application No. PCT/US2013/032299, 15 pgs., (Mar. 19, 2015).
International Search Report dated Jul. 30, 2013 for International Application No. PCT/US2013/032299, filed Mar. 15, 2013, 6 pages.
Shepard, Clayton, et al., "Argos: Practical Many-Antenna Base Stations", Mobicom 2012, Istanbul, Turkey, Aug. 22-26, 2012, pp. 53-64.
Liu, Jian, et al., "A novel and low-cost analog front-end mismatch calibration scheme for MIMO-OFDM WLANs", Radio and Wireless Symposium, 2006 IEEE, San Diego, California, Oct. 17-19, 2006, pp. 219-222.
Written Opinion of the International Searching Authority dated Jul. 30, 2013 for International Application No. PCT/US2013/032299, filed Mar. 5, 2013, 14 pages.

* cited by examiner

METHOD AND APPARATUS FOR INTERNAL RELATIVE TRANSCEIVER CALIBRATION

PRIORITY

The present patent application is a U.S. National Phase Application under 35 U.S.C. § 371 of International Application No. PCT/US2013/032299, filed Mar. 15, 2013, entitled METHOD AND APPARATUS FOR INTERNAL RELATIVE TRANSCEIVER CALIBRATION, which claims priority to and incorporates by reference the corresponding provisional patent application Ser. No. 61/696,648, titled, "Method and Apparatus for Internal Relative Transceiver Calibration for Reciprocity-based MU-MIMO Deployments," filed on Sep. 4, 2012.

FIELD OF THE INVENTION

Embodiments of the present invention relate to the field of wireless device calibration; more particularly, embodiments of the present invention relate to calibrating transceivers in a wireless device based on transmissions with other transceivers in the wireless device.

BACKGROUND OF THE INVENTION

RF-impairment calibration has been thought to be the major challenge in enabling reciprocity-based MU-MIMO. One internal self-calibration method, i.e., the first calibration method which does not require over the air feedback and can enable reciprocity-based MU-MIMO based on moderate and large arrays has been demonstrated.

Conventional downlink MU-MIMO schemes have been at the forefront of investigations in the past decade. These schemes promise spectral efficiency increases by using multiple antennas at the base-station and serving multiple users simultaneously without the need for multiple antennas at the user terminals. This is achieved by using knowledge of the channel state information (CSI) between each user and the transmitting base-station. Having CSIT (CSI available at the transmitter) allows the transmitter to precode the user-terminal streams so that each user terminal sees only its own stream. Given a base station with M transmit antennas, K single-antenna user terminals can be served simultaneously, giving roughly a multiplexing gain equal to min(M,K) with respect to a system serving a single terminal.

For the transmitter to achieve this operation reliably, the transmitter needs to have sufficiently accurate CSIT, i.e., the transmitter needs to know the channels between itself and each of the users sufficiently accurately. The techniques used for acquiring CSIT fall into two categories. The first category employs M pilots (one per base-station transmit antenna) in the downlink to allow each user terminal to estimate the channel coefficients between the user-terminal's own antenna(s) and those of the base-station. This operation provides each CSI at each receiving user-terminal (CSIR) regarding the channel between each base-station transmit antenna and the user-terminal receive antennas. The CSIR, i.e., the CSI information available at each user-terminal, is then fed back to the transmitter by use of uplink transmissions to provide CSIT, i.e., CSI at the transmitting base-station. This category of CSIT acquisition schemes have two overheads: (i) a downlink pilot overhead, which scales linearly with M (then number of antenna elements at the transmitting base-station); (b) an uplink feedback overhead, responsible for making available to the base-station the channels between each user-terminal and each base-station antenna. In the case, each user terminal has a single antenna, and the uplink feedback is responsible for providing to the base-station the MK channel coefficients (complex-scalar numbers), one coefficient for each channel between each user terminal antenna and each base-station antenna. Although the uplink overhead could in principle be made to grow linearly with min(K,M), with the methods used in practice, this overhead grows as the product of M and K. The downlink overhead limits the size of the antenna array, M, that can be deployed. Similarly, the uplink overheads limit both M and K, as the overheads grow very fast with respect to increasing M and K.

The second category of CSIT acquisition techniques is referred to herein as reciprocity-based training schemes. They exploit a property of the physical wireless channel, known as channel reciprocity, to enable, under certain suitably chosen (M,K) pairs, very high-rate transmission with very efficient CSIT training. In particular, pilots are transmitted in the uplink by each user (K pilots are needed, but more could be used) and the corresponding pilot observations at the base-station are directly used at to form the precoder for downlink transmission. If the uplink training and the following downlink data transmission happen close enough in time and frequency (within the coherence time and the coherence bandwidth of the channel) then, the uplink training provides directly the required (downlink channel) CSI at the transmitter, since the uplink and the downlink channels at the same time and frequency are the same. In this category of techniques, the uplink overheads scale linearly with K, i.e., with the number of user terminals that will be served simultaneously. These schemes are also typically envisioned as relying on TDD (Time Division Duplex) in order to allow uplink training and downlink transmission within the coherence bandwidth of the user terminal channel with a single transceiver shared for uplink and downlink data transmission.

One attractive aspect of reciprocity-based training schemes is that one can keep on increasing the size of the transmit antenna array, M, making it "massive", without incurring any increase in the training overheads. Although with M>K, increasing M does not increase the number of simultaneously multiplexed streams, K, (i.e., K streams are simultaneously transmitted, one to each user), increasing M induces significant "beamforming" gains on each stream (which translate to higher rate per stream), at no additional cost in training. Alternatively, increasing M allows reducing the transmit power required to yield a target rate to a user terminal, thereby allowing for greener transmission schemes.

The challenge with reciprocity based training schemes is that the "compound" uplink and downlink channels at the same time and frequency are not the same. Specifically, although the uplink and downlink physical channel components are the same, each compound channel between a "source node" (responsible for transmitting an information-bearing signal from the transmit antenna) and a destination node (attached to the receive antenna) includes additional impairments due to the transmitter (the circuitry, at the transmitter) and the receiver (the circuitry, at the transmitter). When the transmitter and receiver roles are interchanged, different impairments occur at each node, thereby rendering the two compound channels non-reciprocal.

However, these transmitter/receiver impairments vary or drift, very slowly with time (seconds to minutes to longer, depending on the quality of the circuitry). As a result, this opens the door for infrequent calibration, as a method to compensate for these transmitter/receiver impairments and bring reciprocity based MU-MIMO to fruition.

Reciprocity-Based Massive MU-MIMO

Consider the problem of enabling MU-MIMO transmission from an array of M transmit antennas to K single-antenna user terminals. The downlink (DL) channel between the i-th base-station transmitting antenna and the j-th user terminal is given by $$\vec{y}_{ji} = \vec{r}_j \vec{h}_{ji} \vec{t}_i \vec{x}_i + \vec{z}_{ji}$$

where $\vec{x}_i$, $\vec{h}_{ji}$, $\vec{y}_{ji}$, $\vec{z}_{ji}$, denote the transmitted signal from base-station antenna i, the DL channel between the two antennas, the observation and noise at the receiver of user terminal j, respectively. The scalar (complex) coefficient $\vec{r}_j$ contains the amplitude and phase shifts introduced by RF-to-baseband conversion hardware (gain control, filters, mixers, A/D, etc.) at the receiver of user terminal j. Similarly, the scalar (complex) coefficient $\vec{t}_i$ contains the amplitude and phase shifts introduced by the baseband-to-RF conversion hardware (amplifiers filters, mixers, A/D, etc.) at the transmitter generating the signal to be transmitted by base-station antenna i.

Similarly the uplink channel between the j-th user terminal and the i-th base-station antenna is given by $$\overleftarrow{y}_{ij} = \overleftarrow{r}_i \overleftarrow{h}_{ij} \overleftarrow{t}_j \overleftarrow{x}_j + \overleftarrow{z}_{ij}$$

where $$\overleftarrow{x}_j, \overleftarrow{h}_{ij}, \overleftarrow{y}_{ij}, \overleftarrow{z}_{ij},$$

denote the transmitted signal from user terminal j, the uplink (UL) channel between the two antennas, the observation and noise at the receiver of base-station antenna i, respectively. The scalar (complex) coefficient $\overleftarrow{r}_i$ contains the amplitude and phase shifts introduced by RF-to-baseband conversion hardware (gain control, filters, mixers, A/D, etc.) at the receiver of base-station antenna i. Similarly, the scalar (complex) coefficient $\overleftarrow{t}_j$ contains the amplitude and phase shifts introduced by the baseband-to-RF conversion hardware (amplifiers filters, mixers, A/D, etc.) at the transmitter generating the signal to be transmitted by user terminal j.

In the uplink, we have the following model:

$$\overleftarrow{y} = \overleftarrow{R}\overleftarrow{H}\overleftarrow{T}\overleftarrow{x} + \overleftarrow{z}$$

where $\overleftarrow{x}$ is the vector of dimension K×1 (i.e., K rows by 1 column) comprising the user symbols on subcarrier n at symbol time t, $\overleftarrow{H}$ is the M×K channel matrix that includes the constant carrier phase shifts and the frequency-dependent constant in time phase shifts due to the relative delays between the timing references of the different terminals, $\overleftarrow{y}$ and $\overleftarrow{z}$ are the received signal vector and noise at the user terminals, $$\overleftarrow{R} = \text{diag}(\overleftarrow{r}_1, \overleftarrow{r}_2, \ldots, \overleftarrow{r}_M) \text{ and } \overleftarrow{T} = \text{diag}(\overleftarrow{t}_1, \overleftarrow{t}_2, \ldots, \overleftarrow{t}_K).$$

In the downlink, we have the following model $$\vec{y} = \vec{x}\vec{T}\vec{H}\vec{R} + \vec{z}$$

where $\vec{x}$ is the (row) vector of user symbols on subcarrier n at symbol time t, $\vec{H}$ is the K×M channel matrix that includes the constant carrier phase shifts and the frequency-dependent constant in time phase shifts due to the relative delays between the timing references of the different terminals, $\vec{y}$ and $\vec{z}$ are the received signal (row) vector and noise at the user terminals, $\vec{R} = \text{diag}(\vec{r}_1, \vec{r}_2, \ldots, \vec{r}_K)$ and $\vec{T} = \text{diag}(\vec{t}_1, \vec{t}_2, \ldots, \vec{t}_M)$ The matrices $\overleftarrow{R}$, $\overleftarrow{T}$ $\vec{R}$ and $\vec{T}$ are unknown locally constant diagonal matrices. For purposed herein, "locally constant" means that they might vary over very long time (certainly, much longer than the coherence time of the channel), mainly due to thermal drift effects, but they do not depend on any "fast effects" such as frequency offsets, and propagation time-varying fading, since these effects are all already taken care of by the timing and carrier phase synchronization, and included in the matrices $\vec{H}$ and $\overleftarrow{H}$. By reciprocity of the physical channel, the following holds $$\vec{H} = \overleftarrow{H}$$

For simplicity, the thermal noise is neglected. In order to estimate the downlink channel matrix, the K user terminals send a block of K OFDM symbols, such that the uplink-training phase can be written as $$\overleftarrow{Y}_{tr} = \overleftarrow{R}\overleftarrow{H}\overleftarrow{T}\overleftarrow{X}_{tr} + \text{noise}$$

where $\overleftarrow{X}_{tr}$ is a scaled unitary matrix. Hence, the base-station can obtain the channel matrix estimate $$\overleftarrow{Y}_{tr}\overleftarrow{X}_{tr} = \overleftarrow{R}\overleftarrow{H}\overleftarrow{T} + \text{noise}$$

However, in order to perform downlink beamforming we need the downlink matrix $\vec{T}\vec{H}\vec{R}$. While reciprocity ensures that the physical channel component in the uplink estimated channel yields immediately the corresponding component in the downlink channel (it is assumed that uplink training and downlink data transmission occur in the same channel coherence time), the transmit and receive diagonal matrices need to be known for the downlink, while the product of those matrices for the uplink and the channel matrix $\vec{H} = \overleftarrow{H}$ are known, which are generally arbitrarily related.

Prior Art on Relative Calibration

As a prelude to describing one relative calibration method, notice that the downlink channel matrix $\vec{T}\vec{H}\vec{R}$ is not entirely needed to perform beamforming. In fact, only the column-space of this matrix is needed; that is, any matrix formed by $\vec{T}\vec{H}A$, where A is some arbitrary invertible constant diagonal matrix, is good enough for any kind of beamforming. For example, consider Zero Forced Beamforming (ZFBF). The ZFBF precoding matrix can be calculated as $$W = \Lambda^{1/2}[A^H \vec{H}^H \vec{T}^H \vec{T}\vec{H}A]^{-1} A^H \vec{H}^H \vec{T}^H$$

where $\Lambda$ is a diagonal matrix that imposes on each row of the matrix W, the row normalization $\|w_m\|^2 = 1$, for all m. Hence, the ZFBF precoded signal in the downlink will be $$\vec{y} = \vec{u}W\vec{T}\vec{H}\vec{R} + \vec{z}$$

$$= \vec{u}\Lambda^{1/2}\left[A^H \vec{H}^H \vec{T}^H \vec{T}\vec{H}A\right]^{-1} A^H \vec{H}^H \vec{T}^H \vec{T}\vec{H}\vec{R} + \vec{z}$$

$$= \vec{u}\Lambda^{1/2} A^{-1} \vec{R} + \vec{z}$$

We notice that the resulting channel matrix is diagonal, provided that $K \leq M$. It follows that the problem is how to estimate $\vec{T}\vec{H}$ up to the left multiplication by some known matrix A, from the uplink training observation $\overline{R}\overline{H}\overline{T}$ knowing that $\vec{H}=\overline{H}$. Following the relative calibration procedure of Shepard et al. in "Argos: Practical Many-Antenna Base Stations" (Mobicom 2012, pp. 53-64; hereinafter "Argos"), the fact that the diagonal matrices $\overline{R}$, $\overline{T}$, $\vec{R}$, and $\vec{T}$ are essentially constant in time for intervals much longer than the slot duration can be exploited (the calibration procedure may be repeated periodically, every some tens of seconds or even more, depending on the hardware stability, temperature changes, etc.).

The procedure, amounting to one calibration method, consists of the following steps:

Training from a calibration-reference base-station antenna, e.g., antenna 1: sending a pilot symbol from base-station antenna 1 to all other base-station antennas, i.e., to the set of base-station antennas $S=\{2, 3, \ldots, M\}$. The received signal at the BS antennas, S, is given by $$y_{S\leftarrow 1} = \overleftarrow{R_S} h_{S\leftarrow 1} \vec{t_1} + \overleftarrow{z}_{S\leftarrow 1}$$

where $\vec{t_1}$ is the coefficient due to base-station reference antenna (i.e., antenna 1) transmit RF chain, $$\overleftarrow{R_S} = \text{diag}(\overleftarrow{r_2}, \overleftarrow{r_3}, \ldots, \overleftarrow{r_M}),$$

i.e., it is a diagonal matrix containing the coefficients due to the other base-station antennas receive RF chains, the $(M-1) \times 1$ vector $h_{S \leftarrow 1}$ denotes physical channel from reference base-station antenna 1 to the rest of the base-station antennas, and the $(M-1) \times 1$ vector $\overleftarrow{z}_{S-1}$ represents thermal noise at the $(M-1)$ non-transmitting base-station antennas.

Training from the base-station antennas in the set S to the calibration-reference antenna 1: the base-station antennas 2, 3, ..., M respond with a sequence of M-1 symbols each, to form a (proportional to) unitary training matrix (one special case corresponds to sending one pilot each at a time). The signal received by the calibration-reference antenna is given by $$y_{S \to 1} = \vec{X}_{calib} \overline{T}_S h_{S \to 1} \overleftarrow{r_1} + \overleftarrow{z}_{S \to 1}$$

where $\overleftarrow{r_1}$ is the coefficient due to the calibration-reference antenna receive RF chain.

Calibration process: premultiplying by $\vec{X}_{calib}^H$ the BS obtains $$\vec{X}_{calib}^H y_{S \to 1} = \overline{T}_S h_{S \to 1} \overleftarrow{r_1} + \text{noise}$$

Now, notice that, due to physical channel reciprocity, we have $h_{S \to 1} = h_{S \leftarrow 1}$. Hence, for each $m=2, 3, \ldots, M$, the base station can compute the ratios $$\frac{[\vec{X}_{calib}^H y_{S \to 1}]_{m-1}}{[y_{S \leftarrow 1}]_{m-1}} = \frac{\vec{t}_m [h_{S \to 1}]_{m-1} \overleftarrow{r_1} + \text{noise}}{\overleftarrow{r}_m [h_{S \leftarrow 1}]_{m-1} \vec{t}_1 + \text{noise}}$$

$$= \frac{\vec{t}_m}{\overleftarrow{r}_m} \frac{\overleftarrow{r_1}}{\vec{t}_1} + \text{noise}$$

At the end of the calibration process, for sufficiently high SNR such that the noise can be neglected, one has obtained the diagonal calibration matrix $\overline{T}\overline{R}^{-1} \alpha_1$, where $$\alpha_1 = \overleftarrow{r_1} / \vec{t}_1$$

is an irrelevant constant term that depends only on the calibration-reference antenna up and down modulation chains.

At this point, the desired downlink channel matrix can be obtained from the calibration matrix $\overline{T}\overline{R}^{-1} \alpha_1$, and the uplink estimated channel matrix $\overline{R}\overline{H}\overline{T}$ simply by multiplication with the uplink estimated channels. In particular, we have, $$\vec{T}\vec{R}^{-1} \alpha_1$$

$$\alpha_1 \vec{T}\vec{R}^{-1} \overline{Y}_{tr} \overline{X}_{tr}^H = \alpha_1 \vec{T}\vec{R}^{-1} \overline{R}\overline{H}\overline{T} + \text{noise}$$
$$= \vec{T}\vec{H}[\alpha_1 \overline{T}] + \text{noise}$$
$$= \vec{T}\vec{H}A + \text{noise}$$

where $A = \alpha_1 \overline{T}$

The self-calibration process of this calibration method takes at least M OFDM symbols, one symbol for the pilot from reference antenna to all other base-station antennas, and M-1 OFDM symbols to send orthogonal training sequences from all the other base-station antennas to the calibration-reference antenna.

This calibration method has its limitations. First, note that the relative calibration of each base-station antenna with respect to the reference antenna is formed as the ratio of two observations, and, in particular, by dividing $$[\vec{X}_{calib}^H y_{S \to 1}]_{m-1}$$

with $$[y_{S \to 1}]_{m-1}.$$

The noise in the dividing term $[y_{S \to 1}]_{m-1}$, can cause a large estimation error in the calibration estimate. This effect was indeed noticed by the developers of this calibration method: "Another challenge we encountered while performing our indirect calibration approach is the significant amplitude variation for the channels between the reference antenna 1 and other antennas. This is due to the grid-like configuration of our antenna array where different pairs of antennas can have very different antenna spacings. According to our measurement, the SNR difference can be as high as 40 dB, leading to a dilemma for us to properly choose the transmission power for the reference signal." Their solution was to carefully place the reference antenna with respect to the rest of the base-station antennas: "we isolate the reference antenna from the others, and place it in a position so that its horizontal distance to the other antennas are approximately identical. Such placement of the reference antenna does not affect the calibration performance due to our calibration procedure's isolation of the radio hardware channel from the physical channel."

Such a need for careful placement of the reference antenna with respect to the rest of the transmitting antennas is a significant limiting factor in deployments relying on this calibration method, which significantly limits their efficacy in downlink MU-MIMO deployments from sets of non-collocated antennas.

In general, for noise robustness purposes, much larger blocks and maximal ratio combining of the received power can be used, such that we sent D pilot symbols from reference antenna 1 to the other base-station antennas, and M−1 orthogonal training sequences over (M−1)D symbols from the other base-station antennas to the reference one, achieving a factor D in signal to noise ratio for calibration, where D≥1 is some sufficiently large integer in order to improve performance. However, this does not eliminate the inherent limitations of the Argos calibration methods especially for scalable and distributive deployments.

SUMMARY OF THE INVENTION

A method and apparatus is disclosed herein for internal relative transceiver calibration. In one embodiment, the method comprises generating a plurality of processed observations corresponding to pilots transmitted by transceiver units in the entity and observations of the pilots by transceiver units in the entity, each processed observation being indicative of a combined response of a pilot transmitted by transmitter hardware of one transceiver unit at the entity and an observation of the pilot by receiver hardware of another transceiver unit at the entity; grouping the plurality of processed observations into one or more observation pairs, where each observation pair of the one or more observation pairs comprises: a first observation indicative of a combined response between transmitter hardware of a first transceiver unit and receiver hardware of a second transceiver unit in the entity, and a second observation indicative of a combined response between transmitter hardware of the second transceiver unit and receiver hardware of the first transceiver unit in the entity; and calculating, based on at least one of observation pairs, relative calibration values, where each relative calibration value is associated with a transceiver of each transceiver unit and is relative with respect to a transceiver of a reference unit at the entity.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
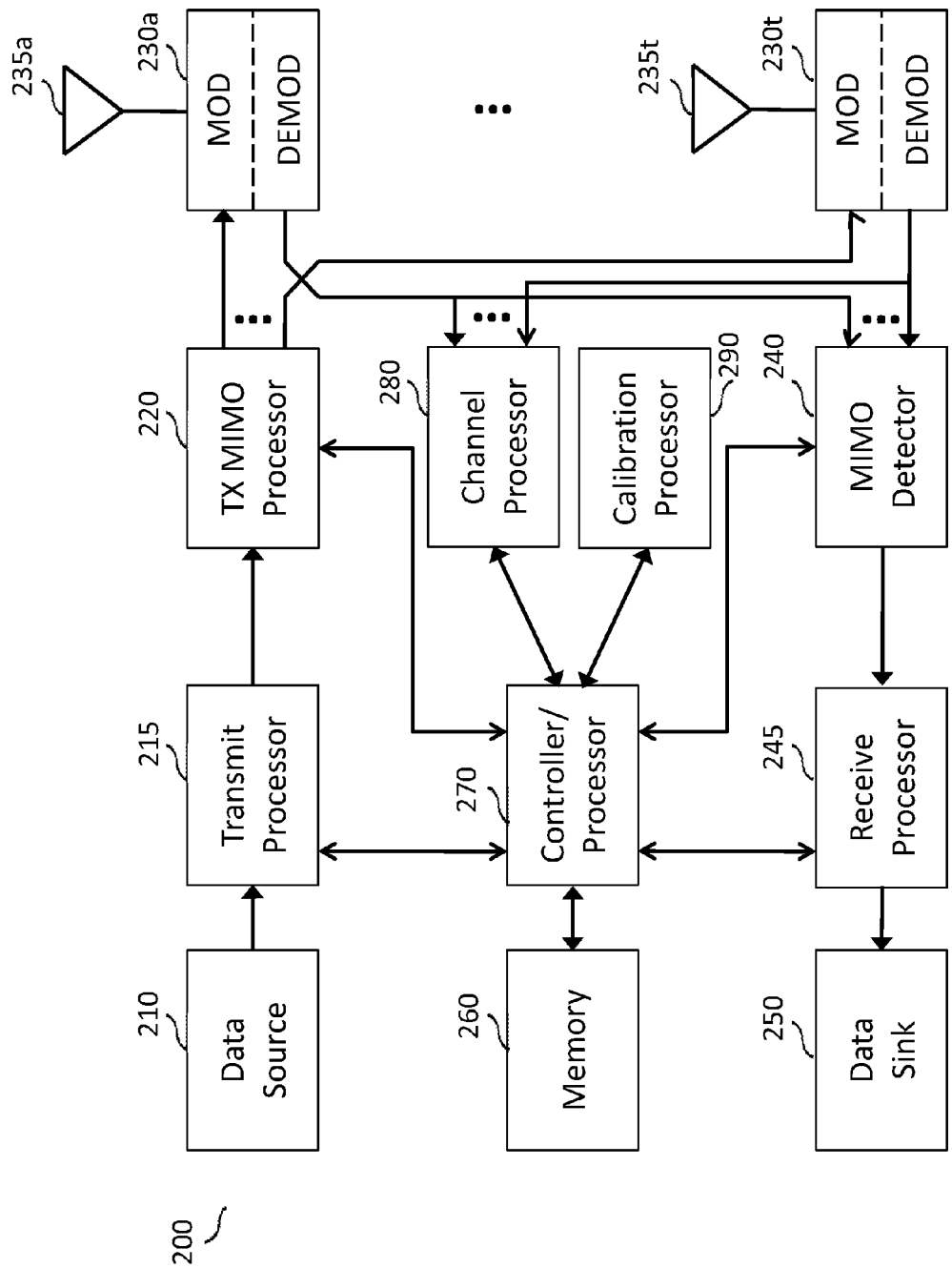
FIG. 1 is a block diagram of one embodiment of a base station that includes a calibration processor unit.

Embodiments of the invention include methods and apparatuses that allow distributed readily scalable relative calibration methods. These relative calibration methods can be used for providing calibration that robustly enables wireless communication schemes, such as, for example, high-performance reciprocity-based downlink MU-MIMO schemes. In particular, the disclosed calibration methods enable MU-MIMO schemes that utilize small, large, or Massive MIMO arrays, with collocated or non-collocated antenna elements. Examples of the non-collocated case involve network MIMO in cellular, transmission from remote radio heads (RRH), but also more general MU-MIMO schemes, in which user terminals are simultaneously served by different (overlapping) sets of antennas in a field of antenna elements.

Embodiments of the invention included a combination of new reference-signaling methods for calibration and new techniques for performing calibration, enabling resource-efficient and reliable and robust calibration for network Massive MIMO, MU-MIMO based on remote radio heads, hierarchical calibration, as well as on demand, distributed calibration for reciprocity based MU-MIMO based on set of possibly overlapping arrays of non-collocated antenna elements.

Embodiments of the invention have the following advantages with respect to other approaches.
1) In the basic scenario considered by one approach, involving a large array of collocated elements, the calibration techniques set forward herein allow substantial improvements in calibration robustness with respect to the one approach, without the need for additional signaling.
2) In contrast to the one approach, the methods in at least one embodiment of the invention can also be used to allow calibration of remote-radio head (RRH) systems for MU-MIMO.
3) Also in contrast to the one approach, the methods in at least one embodiment of the invention can also be used for resource-efficient reliable calibration of cellular deployments for network MIMO transmission.
4) Also in contrast to the one approach, the methods described herein can also be used to enable more general MU-MIMO deployment schemes, in which user terminals are simultaneously served by different (overlapping) sets of antennas in a field of antenna elements.
5) The methods in at least one embodiment of the invention also enable hierarchical calibration and resource-efficient and reliable on-demand calibration.
6) At least one embodiment of the invention also presents reference-signaling methods for hierarchical and/or sequential calibration of subsets of possibly non-collocated possibly overlapping sets of antennas elements so as to enable reciprocity-based MU-MIMO transmission from each such set of antenna elements.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

A method and apparatus for calibrating transceiver units in an entity are described. In one embodiment, each unit includes an antenna element for use in joint transmission from the entity to at least one wireless entity. In one embodiment, the method comprises transmitting at least one pilot from each transceiver unit in the entity using its antenna element; receiving one or more observations at each transceiver unit in the entity using its antenna, each of the one or more observations corresponding to receipt of the at least one pilot being transmitted from one or more other transceiver units in the entity; generate a plurality of processed observations, each processed observation being indicative of a combined response between transmitter hardware of one transceiver unit at the entity and receiver hardware of another transceiver unit at the entity; grouping the plurality of processed observations into one or more observation pairs, where each observation pair of the one or more observation pairs comprises a first observation indicative of a combined response between transmitter hardware of a first transceiver unit and receiver hardware of a second transceiver unit in the entity, and an second observation indicative of a combined response between transmitter hardware of the second transceiver unit and receiver hardware of the first transceiver unit in the entity; and calculating, based on at least one of observation pairs, relative calibration values, where each relative calibration value is associated with a transceiver of each transceiver unit and is relative with respect to a transceiver of a reference unit at the entity.

In one embodiment, the calibration process is performed by a base station, access point or other type of wireless apparatus. In one embodiment, the base station comprises: a plurality of transceivers, each transceiver of the plurality of transceivers comprising an antenna element; a calibration processor coupled to the plurality of transceivers. The calibration processor is operable to control the antenna element of each transceiver unit to transmit at least one pilot; to control the antenna elements of the plurality of transceiver units to receive one or more observations, each of the one or more observations received by one transceiver unit corresponding to receipt of the at least one pilot being transmitted from one or more other transceiver units in the plurality of transceivers; to generate a plurality of processed observations, each processed observation being indicative of a combined response between transmitter hardware of one transceiver unit in the plurality of transceivers and receiver hardware of another transceiver unit in the plurality of transceivers; to group the plurality of processed observations into one or more observation pairs, where each observation pair of the one or more observation pairs comprises a first observation indicative of a combined response between transmitter hardware of a first transceiver unit and receiver hardware of a second transceiver unit of the plurality of transceivers, and a second observation indicative of a combined response between transmitter hardware of the second transceiver unit and receiver hardware of the first transceiver unit; and to calculate, based on at least one of observation pairs, relative calibration values, where each relative calibration value is associated with a transceiver of each transceiver unit and is relative with respect to a transceiver of a reference unit at the base station.

In one embodiment, the relative calibration values comprise estimates of relative calibration coefficients between the transceiver of each of the plurality of transceiver units and the transceiver of the reference unit. In one embodiment, a relative calibration coefficient of one of the transceiver units comprises the ratio of a calibration coefficient of the one transceiver unit over the ratio of a calibration coefficient of the reference unit, and where the calibration coefficient of the one transceiver unit is defined as the ratio of transmitter gain of the one transceiver unit over receiver gain of the one transceiver unit. In one embodiment, the estimates of the relative calibration coefficients are based on the effect of their values on an error metric, wherein the error metric is a function of individual error quantities, each individual error quantity based on a function of the two observations in an individual observation pair. In one embodiment, the relative calibration coefficients are selected as values that minimize the error metric, wherein the error metric is a sum of the squares of the individual error quantities, and wherein each of the individual error quantities is based on an individual pair is a linear combination of the observations in the pair. In one embodiment, the relative calibration values are calculated based on prior calibration estimates.

In one embodiment, the base station determines a channel matrix for a transceiver of at least one of its transceiver units using the estimates of relative calibration coefficients and then determines a precoder based on the channel matrix. The precoder is subsequently used to transmit data.

FIG. 1 is a block diagram of on embodiment of a base station 200 in accordance with this invention. In one embodiment, base station 200 includes standard modules for MIMO wireless transmission.

Referring to FIG. 1, in one embodiment, transmit processor 215 at base station 200 receives data for one or more user equipments (UEs) from a data source 210, processes the data for each UE and provides data symbols to all UEs. In one embodiment, processor 215 also receives and processes control information from a controller/processor 270 and provides control symbols. In one embodiment, processor 270 also generates reference symbols for one or more reference signals. In one embodiment, a transmit (TX) MIMO processor 220 performs precoding on the data symbols, the control symbols, and/or the reference symbols for each UE as well as for reference signals for antennas co-located at the same base station 200 or to other wireless entities such as, for example, other base-stations, remote radio heads (RRHs), etc.

In one embodiment, processor 220 provides parallel output symbols streams to modulators, MODS (230a through 230t). Each modulator 230 further processes (e.g., convert to analog, amplify, filter, and upconvert) the output sample stream to obtain a downlink signal. The downlink signals from modulators 230a through 230t are transmitted via antennas 235a through 235t, respectively.

In one embodiment, at base station 200, the uplink signals from various UE's or by other antennas, collocated at the same base station 200 or located at different base-stations or other wireless entities are received by antennas 235a through 235t, demodulated by demodulators (DEMODs 230a-230t). In one embodiment, the demodulated signals are detected by MIMO detector 240 and further processed by a receive processor 245 to obtain decoded data and control information sent by UE's and other wireless entities. In one embodiment, receive processor 245 receives detected signals from MIMO detector and provides decoded data to a data sink 250 and control information to the controller/processor 270. In one embodiment, the demodulated signals output by DEMODs 230a through 230t are also provided to the channel processor 280 where uplink channel may be estimated and provided to the controller/processor 270.

Base station 200 also includes a calibration-processing unit/processor 290. This is responsible for estimating (and possibly compensating for) the impairments introduced by RF-to-baseband conversion hardware (gain control, filters, mixers, A/D, etc.) coupled with each antenna element 235a through 235t when base station 200 processes uplink received signals from these elements, as well as the impairments introduced by the baseband-to-RF conversion hardware (amplifiers filters, mixers, A/D, etc.) coupled with each antenna element 235a through 235t when base station 200 generates the signals that are to be transmitted by base station antenna elements 235a through 235t. Viewing the combination of element 230a with element 235a as a single (non-calibrated) transceiver unit, and viewing all such combinations of elements 230a through 230t with their respective elements 235a through 235t as individual transceiver units, in one embodiment, calibration processor 290 performs processes for relative calibration of a subset of these transceiver units that are used to enable reciprocity based MU-MIMO from a subset of these transceiver units. In one embodiment, processor 290 exchanges control information with the controller/processor unit 270. The calibration processor 290 calculates calibration values, which are used at controller/processor 270 together with UL channel estimation to construct one or more precoding vectors for one or more UEs and provide them to TX MIMO processor 220 for precoding. In some embodiments, processor 290 is provided additional information from other base stations, indicative of signals received and/or transmitted by other base stations, to assist in relative calibration of transceiver units connected to separate base stations. The embodiments of this invention are enabled by processing unit 290, and involve both the signaling and data collection aspects of calibration as well as the relative calibration methods set forth herein, which are based on the collected data, and, possibly additional parameters, including past relative calibration values for arbitrary subsets of the transmit antenna nodes at this and possibly other base stations.

Controller/processor 270 directs the operation at the base station. Processor 270 and/or other processors and modules at the base station perform or direct operations and/or other processes for the techniques described herein. Memory 260 stores data and program code for the base station.

Robust Relative Calibration

Consider an extension of the Argos approach involving the same topology, and the same number of calibration training slots, i.e. D slots per base station antenna (with $D \geq 1$). The extension is as follows: each antenna, including the calibration antenna 1, first broadcasts independently its training symbols. In one embodiment, this is performed using the same signaling dimensions as Argos, but the matrix $\vec{X}_{calib}$ is diagonal, i.e., when each of the antennas in the set S transmits the remaining set of antennas in S are not transmitting and thereby they can receive. After each antenna has broadcasted its training symbol(s), all the measurements are collected where the following equation $$y_{ij} = \vec{r}_i h_{ij} \vec{t}_j + w_{ij}$$

corresponds to the training symbol from antenna j to antenna i, for each $i \neq j$, $0 \leq i, j \leq M$. This is in contrast to Argos which relies only on the set of observations $y_{i1}$ and $y_{1i}$, for all i. In the preceding equation, $w_{ij}$ is an i.i.d. complex Gaussian noise sample, with appropriate variance (including the effect of the training length D, which may be a design parameter to trade-off efficiency for noise margin, as explained before). Since perfect physical channel reciprocity is assumed, the wireless channel in both directions is considered to be the same (i.e., $h_{ij} = h_{ji}$)

Grouping the above measurements in pairs, the following can be written:

$$\begin{bmatrix} y_{ij} \\ y_{ji} \end{bmatrix} = \begin{bmatrix} \vec{r}_i \vec{t}_j \\ \vec{r}_j \vec{t}_i \end{bmatrix} h_{ij} + \begin{bmatrix} w_{ij} \\ w_{ji} \end{bmatrix}$$

$$= \begin{bmatrix} \frac{\vec{r}_i \vec{t}_j}{\vec{t}_i \vec{t}_j} \\ \frac{\vec{r}_j \vec{t}_i}{\vec{t}_i \vec{t}_j} \end{bmatrix} \vec{t}_i \vec{t}_j h_{ij} + \begin{bmatrix} w_{ij} \\ w_{ji} \end{bmatrix}$$

$$= \begin{bmatrix} \frac{\vec{r}_i}{\vec{t}_i} \\ \frac{\vec{r}_j}{\vec{t}_j} \end{bmatrix} \vec{t}_i \vec{t}_j h_{ij} + \begin{bmatrix} w_{ij} \\ w_{ji} \end{bmatrix}$$

$$= \begin{bmatrix} c_i \\ c_j \end{bmatrix} \beta_{ij} + \begin{bmatrix} w_{ij} \\ w_{ji} \end{bmatrix}$$

where $\beta_{ij} = \vec{t}_i \vec{t}_j h_{ij}$ complex coefficients associated to the unordered pair of antennas i,j.

One goal is to estimate the relative calibration coefficients $c_i$ for $i=1, 2, \ldots, M$, up to a common multiplicative non-zero constant. In the absence of noise, the following equality exists:

$$y_{ij} c_i = y_{ji} c_i = c_i c_j \beta_{ij}.$$

In one embodiment, a natural cost function to be minimized is used in order to find the calibration coefficients is the sum of squared errors $$J(c_1, c_2, \ldots, c_M) = \sum_{\substack{j > i \\ (i,j) \in F}} |y_{ij} c_j - y_{ji} c_i|^2$$

Note that this cost function is an example of a (non-negative) error metric. This error metric is comprises the sum of individual error quantities, whereby each error quantity only depends on a single pair of antenna elements, i and j, and in particular, on pairs of observations collected by base station antenna i(j) during the transmission of a pilot from base station antenna element j(i). In the absence of noise, the error metric takes its minimum value of zero when the correct calibration coefficients are used in the calculation of the error metric. In one embodiment, given that these calibration coefficients are unknown, given a set of pairs of (noisy) calibration-pilot observations, calibration coefficient estimates are calculated by determining the values of the $c_i$'s that minimize the error metric.

Note that the above metric is very attractive because it allows for an efficient computation of the optimal calibration values. However, other such error metrics can be used, wherein the error metric is a function of individual error quantities, and where each individual error quantity is a function of observations between element i and j and the unknown coefficients $c_i$ and $c_j$. In another embodiment, instead of a summation, a weighted summation of individual error quantities can be used. Alternatively, the summation is replaced with a "max" operator. In yet another alternative embodiment, logarithmic functions are used in front of individual error quantities in the summation. Another example of an error matrix corresponds to $$J_\Delta(c_1, c_2, \ldots, c_M) = \sum_{\substack{j > i \\ (i,j) \in F}} g_\Delta(|y_{ij}|, |y_{ji}|) |y_{ij} c_j - y_{ji} c_i|^2$$

where $$g_\Delta(a, b) = \begin{cases} 1 & \min(a, b) > \Delta \\ 0 & \text{otherwise} \end{cases}$$

and where $\Delta$ denotes some predetermined RSS threshold. This metric allows, in a very simple and systematic manner, the elimination of measurement pairs which are not received at sufficiently strong levels.

The set F defines the set of (i,j) pairs of ordered measurements ($y_{ij}$, $y_{ji}$) used for determining the calibration coefficients. In one embodiment, inorder to avoid the trivial all-zero solution, without loss of generality, the following is imposed: $|c_1|=1$. Then, the calibration coefficients are found as the solution of the optimization problem:

$$\text{minimize } J(c_1, c_2, \ldots, c_M) = \sum_{\substack{j > i \\ (i,j) \in F}} |y_{ij} c_j - y_{ji} c_i|^2$$

subject to $|c_1| = 1$

Argos, corresponds to the case of the star topology, i.e., when we use only the measurements $y_{i1}$ and $y_{1i}$, for all $i=2, 3, \ldots, M$, that is, $F=\{(1,2), (1,3), (1,M)\}$. In this case, the objective function is given by $$J(c_1, c_2, \ldots, c_M) = \sum_{i=2}^{M} |y_{1i}c_i - y_{i1}c_i|^2$$

$$= \sum_{j=2}^{M} (|y_{1i}|^2 c_i c_i^* - c_1 y_{i1} y_{1i}^* c_i^* - c_i y_{1i} y_{i1}^* c_1^* + |y_{i1}|^2 c_1 c_1^*)$$

The minimum for fixed $c_1$ can be obtained by differentiating with respect to $c_i^*$ and treating $c_i$, $c_i^*$ as if they were independent variables in a manner well-known in the art (see Hjorungnes et al., "Complex-valued matrix differentiation: Techniques and key results", IEEE Trans. on Signal Processing, 2007, Vol. 55, No. 6, pp. 2740-2746), and then setting all derivatives equal to zero. The following set of equations is obtained:

$$\frac{\partial}{\partial c_i^*} J = |y_{1i}|^2 c_i - c_1 y_{i1} y_{1i}^* = 0, \text{ for } i = 2, 3, \ldots, M$$

which yields $$\hat{c}_i = \frac{y_{i1} y_{1i}^*}{|y_{1i}|^2} c_1 = \frac{y_{i1}}{y_{1i}} c_1.$$

If interested in minimizing J, this solution can be replaced back into J and then solved for $c_1$ in the form $c_1 = \exp(j\theta_1)$. This amounts to a line search over the phase interval $[0, 2\pi)$, which can be easily handled numerically. However, in one embodiment, only the coefficients $c_i$ up to a common multiplicative constant are a concern, and thus this last step is not needed, and $c_1$ can be set equal to 1 arbitrarily, but without loss of generality for the relative calibration purpose. Not surprisingly, as a special case, the same estimator advocated in Argos and reviewed in the previous section can be obtained.

Given a set of ordered pairs, F, the solution to the minimization problem, i.e., determine the calibration coefficients $c_1, c_2, c_3, \ldots, c_M$, up to a multiplicative constant, can be readily obtained. First, given a set F, the set of unordered pairs can be determined as $F_o = \{\text{all pairs}(i,j); \text{ such that}(i,j) \text{ is in } F \text{ or } (j,i) \text{ is in } F\}$.

For example, in the case of the Argos star topology, $F_o = \{(1,2),(1,3), \ldots, (1,M),(2,1),(3,1), \ldots, (M,1)\}$ For convenience, the (F-dependent) set of preprocessed measurements is defined as follows:

$$\tilde{y}_{ij} = \begin{cases} y_{ij} & \text{if } (i,j) \in F_o \\ 0 & \text{otherwise} \end{cases}$$

The minimum for fixed $c_1$ can be obtained by differentiating with respect to $c_i^*$ and treating $c_i$, $c_i^*$ as if they were independent variables [4], and then setting all derivatives equal to zero, i.e., $$\frac{\partial}{\partial c_i^*} J = 0,$$

for $i = 2, 3, \ldots, M$

By expanding the partial derivative in the i-th equation above, the following equation is obtained:

$$0 = \left[ \sum_{j:(i,j) \in F_o} |y_{ji}|^2 \right] c_i - \sum_{j:(i,j) \in F_o} y_{ji}^* y_{ij} c_j$$

$$= \left[ \sum_j |\tilde{y}_{ji}|^2 \right] c_i - \sum_j \tilde{y}_{ji}^* \tilde{y}_{ij} c_j$$

$$= a_i^T c$$

where c and $a_i$ are both M-dimensional column vectors, where the j-th of vector c is given by $c_j$, and where the j-th entry of $a_i$ is given by $$[a_i]_j = \begin{cases} \sum_k |\tilde{y}_{ki}|^2 & \text{if } j = i \\ -\tilde{y}_{ji}^* \tilde{y}_{ij} & \text{if } j \neq i \end{cases}$$

As a result, the set of equations for $i = 1, 2, \ldots, M$ can be described as in matrix notation as $A c = 0$, where $$A = \begin{bmatrix} a_1^T \\ a_2^T \\ \vdots \\ a_M^T \end{bmatrix}$$

$$= [-b_1 \ \tilde{A}_1]$$

Above, $b_1$ is a column vector of dimension M. Its k-th entry contains the negative of the first entry of the vector $a_k$. Similarly, the matrix $\tilde{A}_1$ has M rows and M−1 columns. Its element in the k-th row and m-th column is given by the (m+1)-th element of vector $a_k$. Letting $\tilde{c}_1$ denote the vector of all calibration coefficients in c without $c_1$, i.e., $\tilde{c}_1 = [c_2 c_3 \ldots c_M]$ The least-squares calibration solution $\tilde{c}_1$ is given by the solution to the set of equations $\tilde{A}_1 \tilde{c}_1 = b_1 c_1$, which is given by $$c_{1,Least-Squares} = \begin{bmatrix} \hat{c}_2 \\ \hat{c}_3 \\ \vdots \\ \hat{c}_M \end{bmatrix}$$

$$= (\tilde{A}_1^H \tilde{A}_1)^{-1} \tilde{A}_1^H b_1 c_1$$

Note that other variations of estimates based on the matrix A are possible. In one embodiment, the set of coefficients are chosen that minimize $J(c_1, c_2, \ldots, c_M)$ subject to the average of the powers of the $c_i$'s equaling some predetermined value. In this case, the chosen vector of coefficients corresponds to the eigenvector of the matrix A associated with the smallest-magnitude eigenvalue of A (suitably scaled so as to have its average power equal to the predetermined value).

The choice of the set of pairs of measurements, F, used in the calibration problem, i.e., in choosing the set of measurement pairs that are non-zero, can greatly affect performance. Consider the example in FIG. 2, involving self-calibration of a circular array of 12 antenna elements in the following topologies: (a) a star topology as in Argos; (b) a ring topology; and (c) a denser topology, by using the measurement pairs defined by the "closest four nodes" for each antenna node. The elements are in a "circular" topology, where the distance between elements depicts differences in received power, i.e., nodes closer to each other can receive each other's signals at higher SNR than nodes further away. The array in this example has M=12 elements, but the principles illustrated in the example, apply to arbitrary M>2 values.

Referring to FIGS. 2(a)-2(c), each of the three subfigures shows least-squares calibration based on different sets of measurement pairs, F. The double arrows in each subfigure denote the pairs of measurements used for calibration, i.e., the denoted pairs included in the set F.

FIG. 2(a) shows the set F used by the Argos calibration method. Due to their proximity, calibration of reference-element 1 with respect to reference-element 2 can be expected to be fairly accurate. However, calibration of the reference-element with respect to elements far from it, e.g., element 7 can be expected to be much less reliable. Such problems were indeed noticed in Argos, and required careful placement of the calibration reference antenna with respect to all other antennas. Based on this, the Argos self-calibration technique would have poor performance and would not be sufficient for calibrating arrays of non-collocated antenna elements for Massive MIMO deployments.

FIG. 2(b) shows calibration with based on the measurement pair set F={(1,2), (2,3), . . . , (5,6), (7,8), (8,9), . . . , (11,12), (1,12)}. Although the same number of measurements is used in both FIG. 2(a) and FIG. 2(b), the measurement set in FIG. 2(b) has intrinsically higher SNR per pair and would be significantly more robust. In one embodiment, the coefficient $c_k$ can be obtained sequentially: first the (1,2) pair of measurements is used to obtain $c_2$, then (2,3) pair is used to estimate $c_3/c_2$ and then $c_3$, etc. Such embodiments have effectively the same computation complexity as the Argos calibration method but in general yield higher quality calibration. Alternatively, the set F of measurements shown in FIG. 2(b) can be used to solve the matrix calibration problem, which will yield further improvements over the Argos calibration method, at the computational cost associated with computing the LS solution $\tilde{c}_{1,Least-Squares} = (\tilde{A}_1^H \tilde{A}_1)^{-1} \tilde{A}_1^H b_1 c_1$.

Including also the pair (6,7) in F, i.e., including also the pair depicted by the dashed double arrow in FIG. 2(b) would also be expected to further improve performance. This inclusion does not require more signaling and simply requires storing more observations during calibration signaling for later use for calibration.

FIG. 2(c) shows another example in which, with exactly the same wireless signaling overhead for calibration, about twice as many measurement pairs are used (in particular, for each antenna, pairs with the closest 4 nodes are used), yielding further performance improvements.

Figure 3:
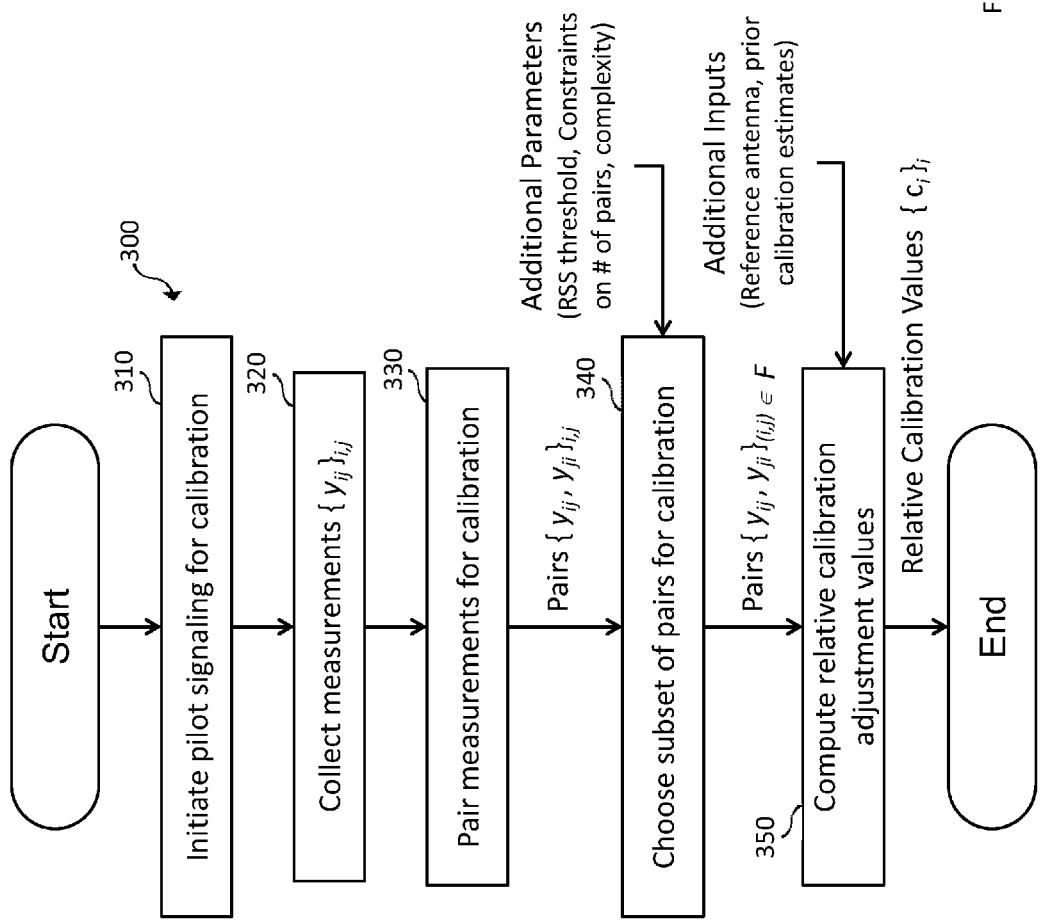
FIG. 3 is a flow diagram of one embodiment of a process for relative calibration.

FIG. 3 is a flow diagram of one embodiment of a process for performing relative RF calibration. The process is performed by processing logic that may comprise hardware (circuitry, dedicated logic, etc.), software (such as is run on a general purpose computer system or a dedicated machine), or a combination of both. In one embodiment, the process is performed by calibration processor 290 of FIG. 1 in cooperation with the transceiver units and the other supporting functionalities of base station 200.

Figure 2:
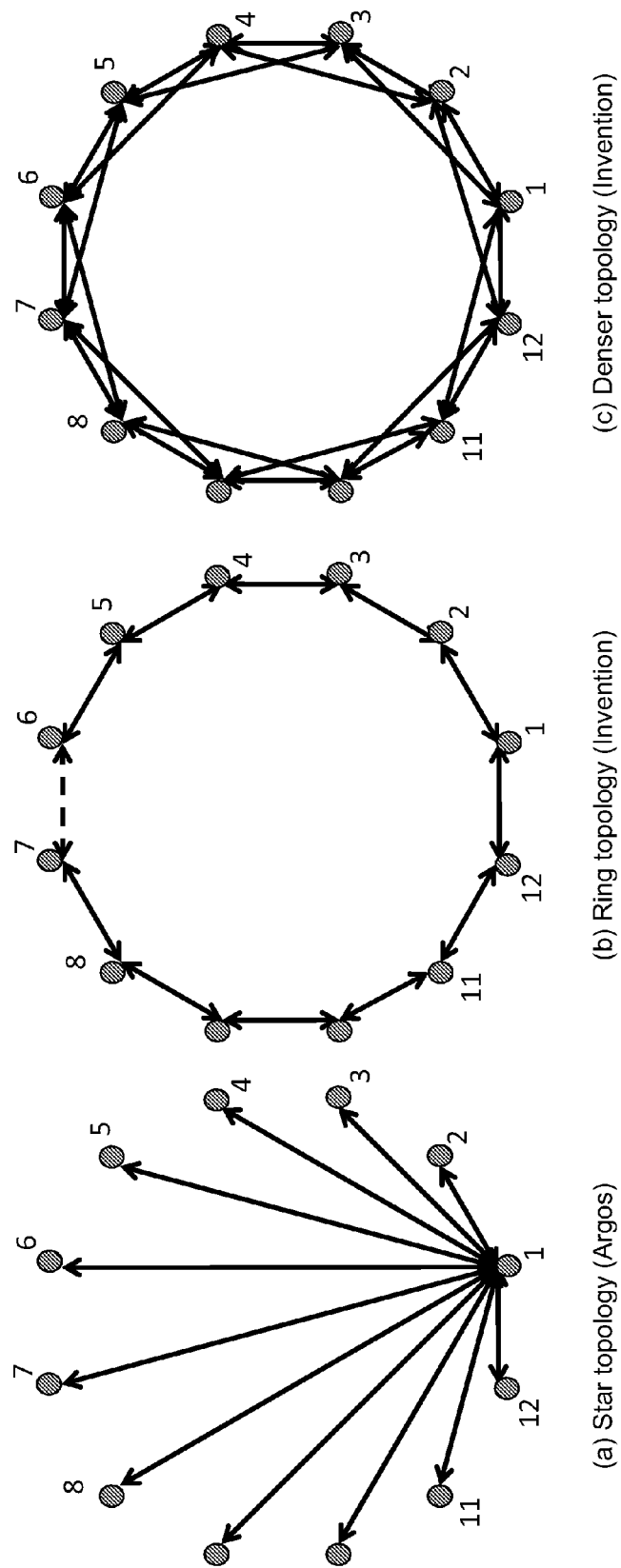
FIGS. 2(a)-(c) illustrate three examples of pairs of measurements that can be used for self-calibrating a circular array of antenna elements.

Referring to FIG. 2, the process starts by initiating pilot signaling (processing block 310). After pilot signaling, processing logic performs measurement collection (processing block 320), and processing logic pairs measurements for calibration (processing block 330). In one embodiment, antenna measurements collected through a calibration signaling process are the input to the calibration method. In one embodiment, $y_{ij}$ measurements for all (i,j) antenna pairs are available, and the set of collected observations are first grouped into pairs $(y_{ji}, y_{ij})$.

Next, in one embodiment, processing logic selects a subset F of these pair-wise measurements for calibration (processing block 340). In one embodiment, the set F used for calibration includes a chosen subset of pair-wise measurements, out of all the possible (i,j) antenna-element pairs. In one embodiment, the set F only includes measurements exceeding a predetermined threshold in received power level. In one embodiment, a pair is included in F, if the minimum of the received power levels in the received pair of measurements exceeds a predetermined level. In one embodiment, other criteria are used to include or exclude a pair from the set F including limiting the total number of pairs of observations used, while guaranteeing that all the terms can be estimated, as e.g., illustrated in the examples shown in FIG. 2(a) and FIG. 2(b). These may include RSS thresholds, constraints on the number of pairs and complexity. For example, all of the pairs could be ordered according to their RSS from highest to lowest and then the first X pairs could be chosen, where X is an integer. The number of pairs chosen may also affect the complexity of the calibration algorithm. The pairs may also be selected based on other criteria that may allow splitting a large-size calibration problem (involving a large number of antennas, and, thereby, manipulations of a matrix A of large dimensions) into smaller calibration problems (involving manipulations with smaller-size matrices). Such embodiments are set forth in the Hierarchical Calibration Section.

Returning to FIG. 3, other criteria may be used to include or exclude pairs. For example, in one embodiment, the algorithm estimates the relative calibration gain of a transceiver unit if it is at least in one of the pairings in the selected F. For example if there is a transceiver unit to be calibrated but the measurement pair inclusion algorithm does not select any pairs involving this transceiver unit, one or more pairs can be added to the set F which involve this transceiver unit.

At processing block 350, processing logic computes relative-calibration values based measurements of the chosen subset of pairs in the chosen subset to calculate relative calibration values with respect to a reference antenna. In one embodiment, prior calibration estimates can be used as well.

MU-MIMO Operation

Based on a given set of estimates, $-\hat{c}_k$ of the relative calibration parameters, the MU-MIMO training and signaling operation may be performed. First, observations are collected based on uplink pilots. These observations are then used at a central server to obtain an MMSE estimate of the $H^{up}$, namely, $\hat{H}^{up}$. Assuming the set of $\{\hat{c}_k\}_{k=2}^{N_A}$ is computed via an equation of the form $\tilde{c} = -(\tilde{A}_1^H \tilde{A}_1)^{-1} \tilde{A}_1^H a_1 c_1$ with $c_1=1$, the matrix $H_{alt}$ is then constructed as follows: $H_{alt} = \text{diag}(1, \hat{c}_2^{-1}, \ldots, \hat{c}_{N_A}^{-1}) \hat{H}^{up}$.

If $\hat{c}_i$ is replaced with $c_i/c_1$, and $\hat{H}^{up}$ with $H^{up}$, the matrix $H_{alt}$ takes the desired form with D diagonal. Consequently, given $H_{alt}$, and any given precoder function $V=V(H_{alt})$, such as e.g., ZFBF in $V(H_{alt}) = \Lambda^{1/2} [H_{alt}^H H_{alt}]^{-1} H_{alt}^H$, the effective downlink channel is given by $Y = uVTB\tilde{R} + Z$, with effective $N_U \times N_U$ channel matrix given by $\Phi = VTB\tilde{R}$. Then the instantaneous rate of the quantity $\log_2(1 + SINR_i)$ can be used as the performance metric for the ith user, with $SINR_i$ computed in the usual manner.

Hierarchical Relative Calibration

Figure 4:
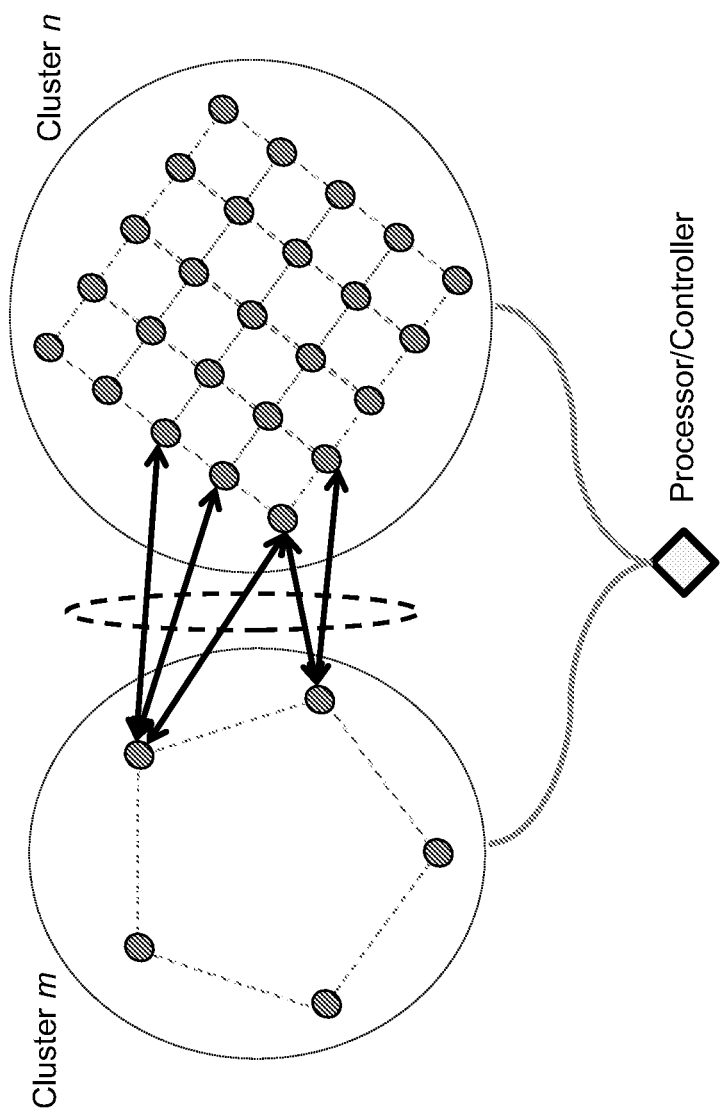
FIG. 4 illustrates an example of hierarchical cluster calibration.

In one embodiment, calibration occurs in stages. In particular, consider the example in FIG. 4 involving two sets of antenna elements, one having a 5×5 antenna of possibly collocated arrays (depicted as cluster n) and another array of 5 elements (depicted as cluster m). Let $c_{i,m}$ denote the unknown calibration coefficients in cluster m for i=1, 2, ..., $M_m$, and let $c_{j,n}$ denote the unknown calibration coefficients in cluster n for j=1, 2, ..., $M_n$. In the example in FIG. 4, $M_m$=5, and $M_n$=25.

Although the total set of $M_m+M_n$=30 array elements can be calibrated together with a single calibration LS step, in one embodiment, the calibration is performed in stages. In one embodiment, first intra-cluster calibration, i.e., calibrate each cluster separately and independently is performed, and then inter-cluster calibration is performed. Effectively, for intra-cluster calibration, only measurement pairs within a cluster are used, and due to the relative proximity of nodes within a cluster as opposed to those in different clusters, such intra-cluster pairs of measurements may be expected to be more reliable (higher SNR) for calibration. As a result, it is assumed that self-calibration in cluster m has yielded coefficients $\hat{c}_{i,m}$, satisfying $c_{i,m} \approx \alpha_m \hat{c}_{i,m}$, for some unknown complex-valued scaling constant $\alpha_m$, and self-calibration in cluster n has yielded coefficients $\hat{c}_{j,n}$ satisfying $c_{j,n} \approx \alpha_n \hat{c}_{j,n}$, for some unknown complex-valued scaling constant $\alpha_n$. Thereafter, inter-cluster calibration effectively amounts to finding the set of cluster calibration coefficients for $c_{i,m}$ and $c_{j,n}$ up to a common scaling constant. This is equivalent to finding $\alpha_m$ and $\alpha_n$, up to a common scaling constant, or equivalently $\alpha_m/\alpha_n$, or equivalently estimating the complex constant $\beta$ in the relationship $\alpha_m = \beta \alpha_n$. This can be done via LS calibration based on any non-zero subset of inter-cluster measurement pairs, i.e., bidirectional measurements for some ((i,n), (j,n)) pairs of antennas for some (i, j), and replacing $c_{i,m}$ and $c_{j,n}$ with the expressions $\alpha_m \hat{c}_{i,m}$ and $\alpha_n \hat{c}_{j,n}$, in the pair of equations describing the measurement pair. Equivalently, letting $y_{(i,m)(j,n)}$ and $y_{(j,n)(i,m)}$ denote the measurements at nodes (i,m) and (j,n) respectively, when calibration pilots are sent by nodes (j,n) and (i,m) respectively, in one embodiment, the following optimization problem is used:

minimize $$J(c_{(1,m)}, c_{(2,m)}, \ldots, c_{(M_m,m)}, c_{(1,n)}, c_{(2,n)}, \ldots, c_{(M_n,n)}) = \sum_{((i,m),(j,n)) \in F'} |y_{(i,m)(j,n)} c_{(j,n)} - y_{(j,n)(i,m)} c_{(i,m)}|^2$$

subject to $$c_{i,m} = \alpha_m \hat{c}_{i,m},$$

$$c_{j,n} = \alpha_n \hat{c}_{j,n},$$

and $$\alpha_n = 1$$

Letting $\hat{y}_{(i,m)(j,n)} = y_{(i,m)(j,n)} \hat{c}_{(j,n)}$, and $\hat{y}_{(j,n)(i,m)} = y_{(j,n)(i,m)} \hat{c}_{(i,m)}$, the problem can be recast as follows minimize $$J(\alpha_m, \alpha_n) = \sum_{((i,m),(j,n)) \in F'} |\hat{y}_{(i,m)(j,n)} \alpha_n - \hat{y}_{(j,n)(i,m)} \alpha_m|^2$$

subject to $$\alpha_n = 1$$

This problem has exactly the same structure as the original intra-cluster LS problems. In particular, subject to a given set of inter-cluster measurement pairs defined by F', the least-square calibration problem can be solved using the same steps as the ones used to solve the original least squares problem. In one embodiment, inter-cluster calibration is performed over more than two clusters by solving for a set of reference inter-cluster calibration coefficients in a similar manner.

In general, hierarchical calibration can be used to jointly calibrate groups of transceiver units, where the number of groups jointly calibrated is larger than 2. One embodiment involving such use of hierarchical calibration, involves limiting the complexity to calibrating groups with no more than "X" groups of units at time. With X=9, for instance, in one embodiment transceiver units would first be calibrated in groups of size, e.g., 9, (i.e., a need to limit the size of the matrix A based on which the calibration algorithm is performed), allowing each group of 9 transceiver units to be independently calibrated relative to their own reference unit. Hierarchical calibration can then be readily used to jointly calibrate much larger sets, without violating this "size" constraint. In one embodiment, first close-by sets of antennas of size 9 are calibrated based on the base-line algorithm (intra-cluster calibration). Then, (inter-cluster) calibration of 9 such closely located (already calibrated 9-element) sets can be performed, yielding calibrated groups of $9^2$ elements. Then inter-cluster calibration of 9 such closely located (already calibrated $9^2$-element) sets can be performed, yielding calibrated groups of $9^3$ elements), etc. The complexity of each one of these set-of-9 calibration operations is fixed; it is the same as the calibration complexity of the basic relative calibration of a group of 9 un-calibrated antenna elements.

More specifically, for convenience cluster nodes within each cluster are re-indexed, and the m-th node in cluster i is denoted by (i,m). Let $c_{i,m} = R_{i,m}/T_{i,m}$ denote the unknown parameter of interest. It is assumed that for each i, sufficiently accurate intra-cluster calibration has been performed using an algorithm so that each node has been calibrated relative to a reference node in cluster $c_i$. In particular, given that the algorithm applied to cluster i has returned intra-cluster calibration estimates $\{\hat{c}_{i,m}\}_m$, we have $$c_{i,m} \approx \hat{c}_{i,m} c_i. \quad (16)$$

for some unknown parameter $c_1$. Also let $Y_{(i,m) \to (j,n)}$ denote the observation at node (j, n) based on a pilot transmitted by node (i, m), i.e., an observation of the form (11), with i and j replaced by (i, m) and (j, n), respectively.

Consider clusters as nodes on a graph. Assume a connected cluster-network graph ($\mathcal{T}^{cl}$, $\mathcal{E}^{cl}$), pilot bursts are transmitted and received by BSs across clusters over a connected spanning subgraph ($\mathcal{T}^{cl}$, $\mathcal{F}^{cl}$), including all the clusters and a subset of links ($\mathcal{F}^{cl} \subseteq \mathcal{E}^i$). Also let $\mathcal{F}^{cl}$ denote the set of undirected edges corresponding to $\mathcal{F}$. A pair (i, j)$\in \mathcal{F}_u^{el}$, if there is at least one pair of observations $\{Y_{(i,m) \to (j,n)}, Y_{(j,m) \to (i,n)}\}$ of the form (11) that are to be used for calibration, and where the pair is due to a pair of calibration pilots transmitted by BSs (i, m) and (j, n) on distinct OFDM symbols but within the coherence-time of the channel. Let $\mathcal{G}_{ij}$ denote the set of all (m, n) index pairs for which such bi-directional pairs of observations are available between APs (i, m) and (j, n), in clusters i and j respectively. Thus, (i, j)$\Sigma \mathcal{F}_u^{el}$ if and only if the set $\mathcal{G}_{ij}$ is non-empty.

Figure 20:
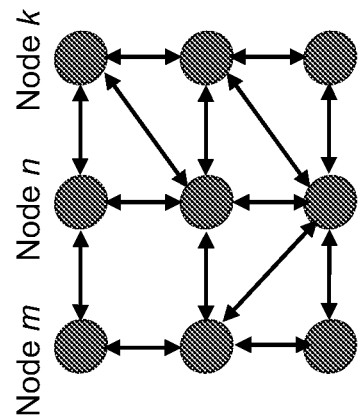
FIG. 20 illustrates a corresponding connected spanning subgraph ($\mathcal{T}^{cl}, \mathcal{E}^{cl}$), associated with the two-way measurements shown in FIG. 19, on which the inter-cluster calibration is to be performed.
Figure 19:
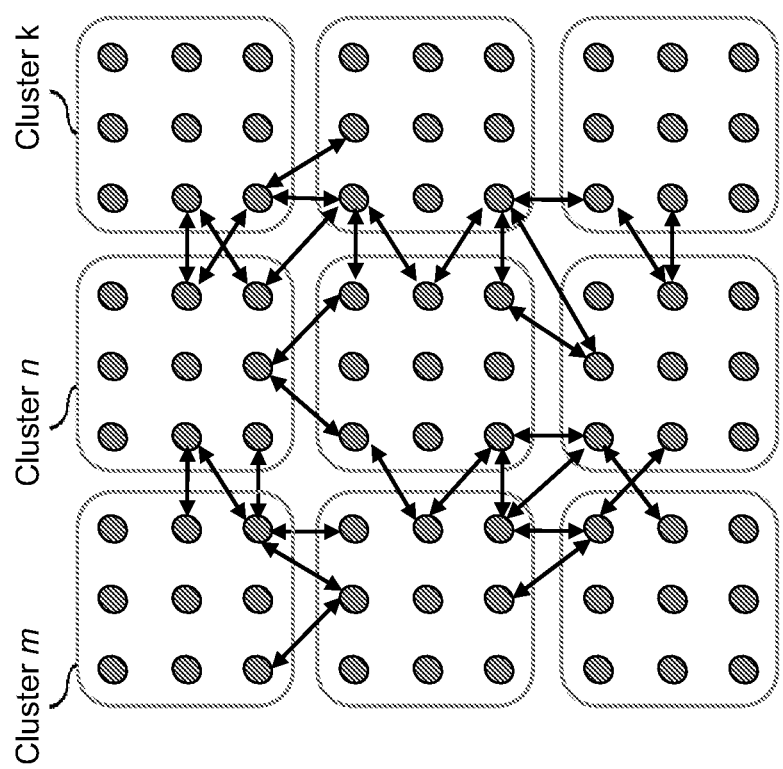
FIG. 19 illustrates a 9×9 network of nodes.

A visual interpretation of the hierarchical calibration problem is shown in FIGS. 19 and 20. FIG. 19 depicts a 9×9 network of nodes. As shown in FIG. 19, there are nine 3×3 clusters of BSs. Assuming intra-cluster calibration has already been performed within each 3×3 cluster, the bidirectional arrows (where each arrow represents two-way measurements between BSs in different clusters) represent a set of measurements that can be used for inter-cluster calibration.

FIG. 20 shows the corresponding connected spanning subgraph ($\mathcal{T}^{cl}$, $\mathcal{F}^{cl}$), associated with the two-way measurements shown in FIG. 19, on which the inter-cluster calibration is to be performed. The associated objective function for inter-cluster calibration can then be readily expressed as follows $$J_h = \sum_{(i,j) \in \mathcal{F}_u^{cl}} \sum_{(m,n) \in \mathcal{G}_{ij}} |c_{i,m} Y_{(i,m) \to (j,n)} - c_{j,n} Y_{(j,n) \to (i,m)}|^2$$

The solution can be readily derived by following the same steps. Letting $$\tilde{Y}_{(i,m) \to (j,n)} = \hat{c}_{(i,m)} Y_{(i,m) \to (j,n)}$$

and using (20) we can re-express $J_h$, as a function of the $c_i$'s as follows $$J_h = \sum_{(i,j) \in \mathcal{F}_u^{cl}} |c_i \tilde{Y}_{(i,m) \to (j,n)} - c_j \tilde{Y}_{(j,n) \to (i,m)}|^2$$

Letting $\tilde{c} = (c_2, \ldots, c_{N_C})^T$ with $N_C = |\mathcal{T}^{cl}|$, the vector $\tilde{c}$ that minimizes the above formula as a function of $c_1$ is given by (16), and where A is the $N_C \times N_C$ matrix with element in its i-th row and j-th column given by $$A_{i,j} = \begin{cases} \sum_{j:(i,j) \in \mathcal{F}_u^{cl}} \sum_{(m,n) \in \mathcal{G}_{ij}} |\tilde{Y}_{(i,m) \to (j,n)}|^2 & \text{for } j = i \\ -\sum_{(m,n) \in \mathcal{G}_{ij}} \tilde{Y}^*_{(i,m) \to (j,n)} \tilde{Y}_{(j,n) \to (i,m)} & \text{for } j \neq i, \end{cases}$$

Notice that for some i≠j, the coefficient $A_{i,j}$ may be zero, if $\mathcal{G}_{ij}$ is empty, i.e., if $(i,j) \notin \mathcal{F}_u^{el}$.

Figure 5:
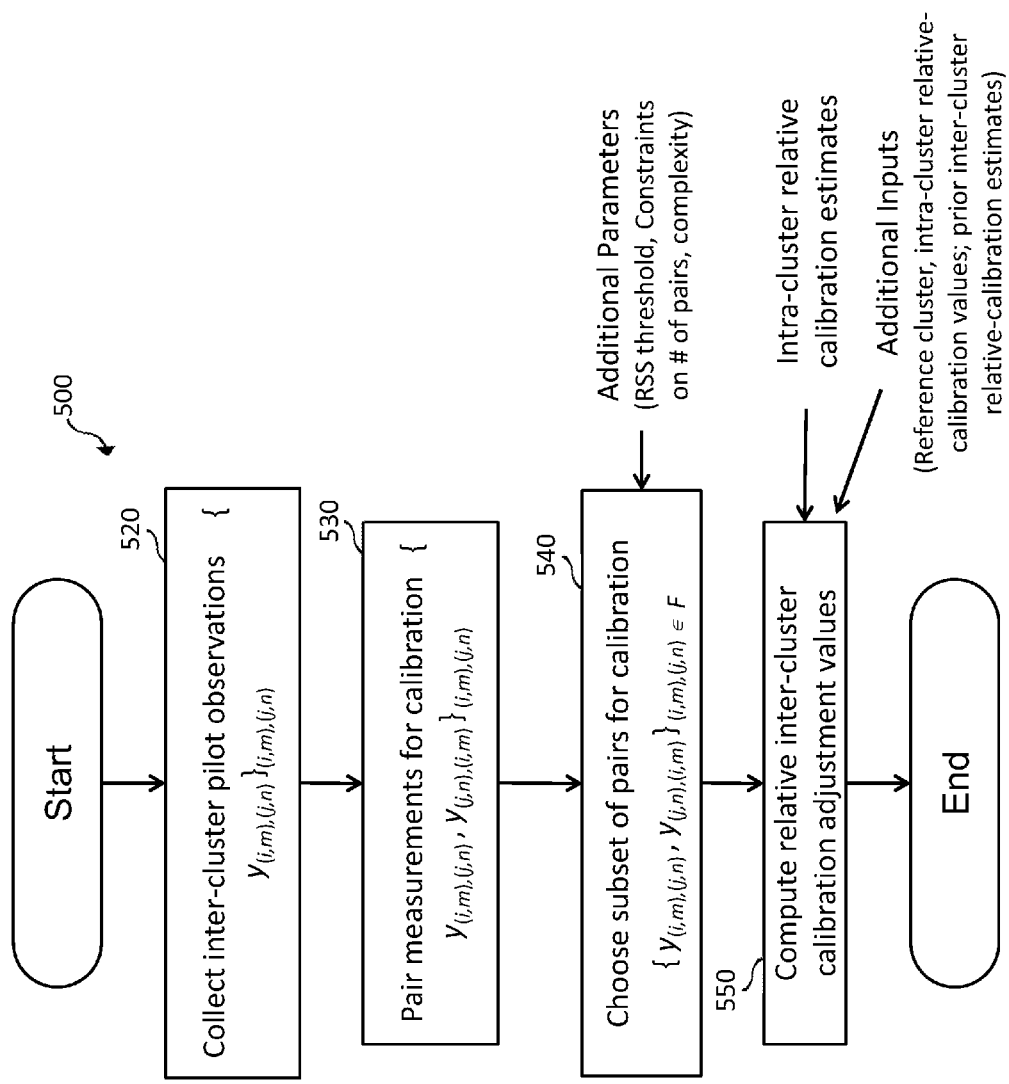
FIG. 5 is a flow diagram of one embodiment of a process for hierarchical (inter-cluster) relative calibration.

FIG. 5 is a flow diagram of one embodiment of a process for performing hierarchical calibration. The process is performed by processing logic that may comprise hardware (circuitry, dedicated logic, etc.), software (such as is run on a general purpose computer system or a dedicated machine), or a combination of both. In one embodiment, the process is performed by calibration processor 290 of FIG. 1 in cooperation with the transceiver units and the other supporting functionalities of base station 200.

Referring to FIG. 5, the process begins by processing logic collecting inter-cluster observations (processing block 520). In one embodiment, collecting inter-cluster observations comprises retrieving from memory (e.g., memory 260) observations obtained at cluster m(n) during the transmissions of pilots from antennas at the other cluster. Processing logic assembles a subset of these observations in pairs (processing block 530), in a manner analogous in one embodiment to processing block 330. Specifically, each pair of observations formed by processing block 530 is comprised of two observations collected by two distinct antennas (one antenna from each cluster), where each observation corresponds to an observation collected by one antenna in the pair in response to a pilot transmitted by the other antenna in the pair, and where the two pilots were transmitted within the coherence time of the channel.

After pairing measurements, processing logic selects a subset of these pairs of observations for inter-cluster calibration (processing block 540). In one embodiment, all the pairs are used for inter-cluster calibration. In another embodiment, only the pairs with sufficiently large RSS (see paragraph 49 above) in the pair are chosen in the set F.

After selection, processing logic uses the selected pairs of observations for computing the inter-cluster calibration adjustment coefficients (processing block 550). In one embodiment, the inter-cluster calibration comprises setting $\alpha_n = 1$ (thus, not making any adjustments to the calibration coefficients of cluster n), computing a value for $\alpha_m$ via the least-squares method outlined in the preceding paragraphs, and adjusting the calibration coefficients for each of the antennas in cluster m using the computed value of $\alpha_m$ (i.e., setting the new calibration value for a given antenna in cluster m as its previous value times the inter-cluster adjustment $\alpha_m$).

In one embodiment, inter-cluster calibration is performed on demand. In one embodiment, intra-cluster calibration has already been performed at a previous time instance (e.g., it has already been used to serve users via MU-MIMO transmissions separately emanating from each of the cluster of arrays). As a UE (e.g., a mobile) passes through an area where it is advantageous to be served by a joint transmission through multiple sites, inter-cluster calibration is activated to calibrate the multiple antenna clusters. In one embodiment, first calibration pilots are transmitted by one (or more) of the antennas of one or more clusters. In response, each of the other clusters transmits back calibration pilots from a one or more of their antennas. In one embodiment, these antennas are chosen based on the received signal strength at these antennas from one or more first calibration pilots emanating from different clusters. In one embodiment, several layers of hierarchical calibration are applied, yielding successively larger clusters of relatively calibrated antenna arrays.

Calibration for Network MIMO Over Cellular

Figure 6:
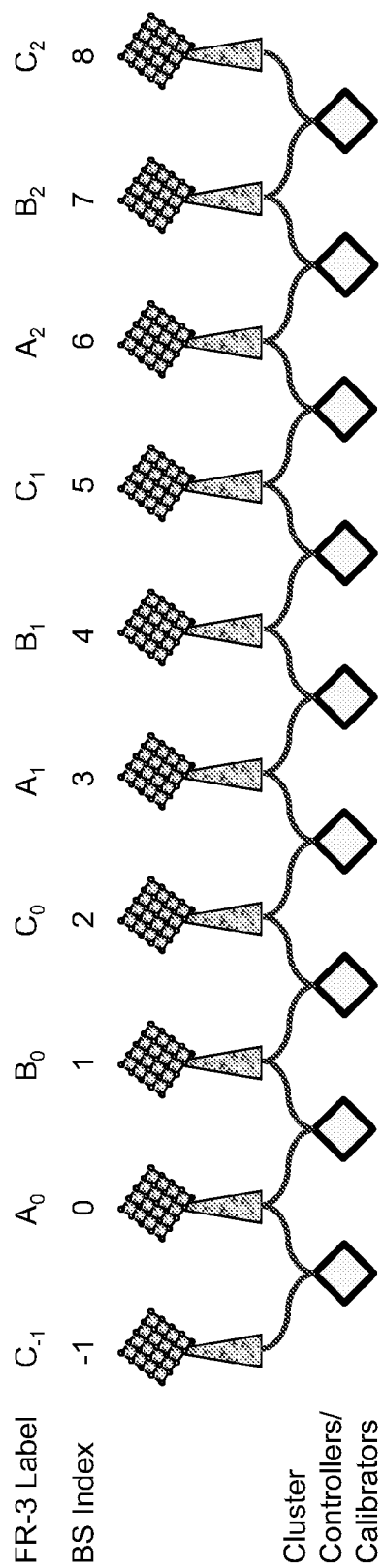
FIG. 6 illustrates an example of calibration of 2-BS clusters of antennas in one-dimensional cellular network.

The above calibration techniques can be tailored towards calibrating cellular architectures for reciprocity-based MIMO transmission. FIG. 6 shows a one dimensional (1D) cellular topology in which base stations are placed at reference locations 0, ±1, ±2, ±3, . . . on the real axis. Very high cell and cell-edge rates can be obtained by geographic scheduling of users, where users at similar "geographic" locations with respect to their associating base-station(s) are jointly served across the topology with a MIMO architecture that is tailored to these user locations. Furthermore, in one embodiment, cellular reuse-1 Massive MIMO is preferable for users at the center of the cell, whereas, at the cell edge network MIMO transmission from the two neighboring towers is often preferred at the edge. Similar statements hold for two-dimensional (2D) hexagonal deployments. To enable such transmissions, the set of antenna elements engaged in joint MU-MIMO transmission are jointly calibrated. In the 1D example, the reference 2-base station (BS) clusters are jointly calibrated.

Consider signaling and calibration for a cellular network of the form shown in FIG. 6. It is desirable that the cluster controller, which is to conduct joint MU-MIMO transmission from the set of BSs with indices k and k+1, has available, after calibration, a set of relative calibration coefficients for all the antennas from the cluster. This can be accomplished in a variety of ways. In one embodiment, pilots are transmitted from all BSs in the topology with frequency reuse R>2. In the example depicted in FIG. 6, corresponding to R=3, time-frequency calibration-training resources are split into R=3 equal portions, referred to as the "A", "B", and "C" portions of the resources. Base stations with labels $\{A_k\}$ ($\{B_k\}$ and $\{C_k\}$, respectively) simultaneously transmit pilots during the "A" ("B" and "C", respectively) training resources. Assuming there is M antenna elements per BS, M resource dimensions are required for calibration, i.e., in order to transmit M pilots from each of the base station with label A (B, and C, respectively). In one embodiment, RM training dimensions are used across the topology to transmit one pilot per BS antenna in a frequency reuse-R manner.

In one embodiment, depicted in FIG. 6, a pilot transmitted by base station $A_k$ generates measurements at each of the antenna elements one base-stations $B_k$ and $C_{k-1}$, and at each of the non-transmitting elements on base station $A_k$. These measurements at base station $A_k$ can be used for intra-cell calibration at BS $A_k$. The measurements at base station $B_k$ {or, alternatively, base-station, $Ck_{-1}$} can be exploited by the controller/calibrator of the $\{A_k, B_k\}$ cluster in FIG. 6 (alternatively, the $\{C_{k-1}, A_k\}$ cluster), together with the measurements collected at base station $A_k$ when $B_k$ (alternatively, $C_{k-1}$) is transmitting pilots, for inter-cell calibration. In principle, these measurements at $B_k$ also contain terms from all the other base-stations in the set $\{A_j\} j \neq k$, since they are also transmitting pilots at the same time and frequency as $A_k$. In this 1D example, the dominant interfering term seen at base station $B_k$ is due to the pilots transmitted by base station $A_{k+i}$. The reuse factor, R, is at least as large as 3 in this example in order to ensure that calibration pilots from base station $A_k$ are received at base station $B_k$ at a higher power level than (interfering) calibration pilots from $A_{k+1}$. Even higher reuse values for R can be used in order to ensure that the contribution of pilots transmitted from base station $A_k$ (signal term) are received at sufficiently high signal-to-interference ratio.

Figure 7:
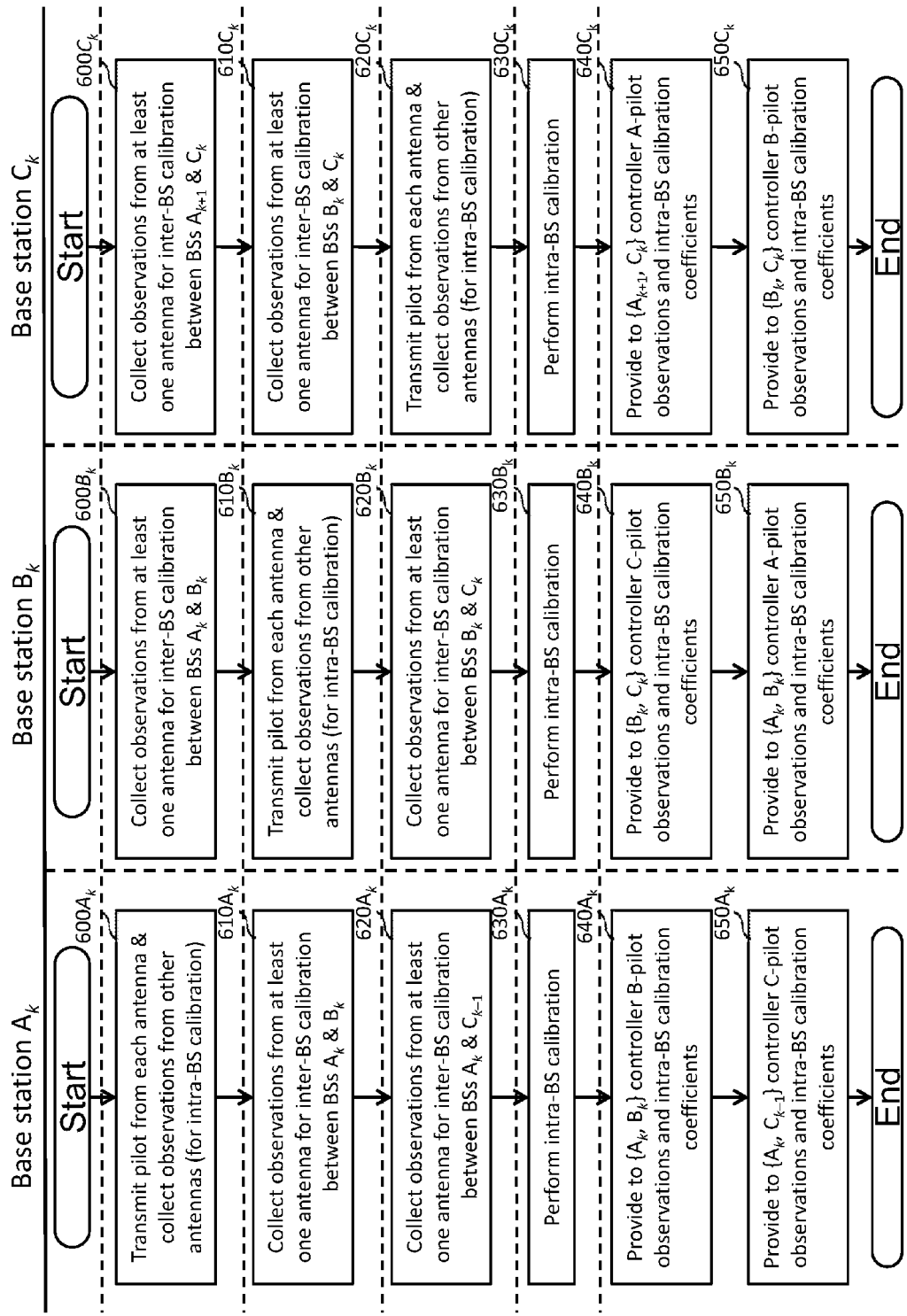
FIG. 7 is a flow diagram of one embodiment of a process for cluster-calibration for network MIMO on the 1D network of FIG. 6.

FIG. 7 is a flow diagram of one embodiment of a process for cluster-calibration with R=3. The process is performed by processing logic that may comprise hardware (circuitry, dedicated logic, etc.), software (such as is run on a general purpose computer system or a dedicated machine), or a combination of both. In one embodiment, the process is performed by calibration processors (e.g., calibration processor 290 of FIG. 1) in cooperation with the transceiver units and the other supporting functionalities their respective base stations (e.g., base station 200).

Referring to FIG. 7, during a slot in "A" portion of the resources, group A base stations ($\{A_k\}$) transmit pilots on the same resources. In FIG. 7, this is shown at processing block 600$A_k$ for base station $A_k$. These pilots are collected by antennas of adjacent cells (as an example see processing blocks 600$B_k$ and 600$C_k$) as well as other antennas of the same base station (processing block 600$A_k$). Then similar operations are done for other base station groups. Using the intra-cell measurements, each BS performs intra-BS calibration, as shown by processing blocks 630$A_k$, $B_k$, $C_k$ in FIG. 7.

Next, collected observations from adjacent base stations are passed to the corresponding controller for each adjacent base station pair (processing blocks 640$A_k$, $B_k$, $C_k$, and processing blocks 650$A_k$, $B_k$, $C_k$) to be used in inter-calibration. Then controllers perform inter-calibration procedure as described in FIG. 5 (processing block 500).

In one embodiment, first intra-cell calibration is performed, as the "intra-cell calibration measurements" are higher-SNR measurements. In one embodiment, hierarchical calibration is performed once intra-cell calibration is completed as described above with respect to hierarchical calibration. In one embodiment, only subsets of inter-cell measurements of sufficiently high received-signal strength are used in the inter-cell calibration step. These embodiments use at least RM dimensions to calibrate the whole network, with R at least as large as 3, but possibly larger R.

In the case that the array size becomes "Massive", i.e., when M becomes large, the cost of RM dimensions for calibration becomes significant, and other more efficient methods that only require order-M dimensions for calibration. In one embodiment, reuse-1 pilot schemes are first used to accomplish intra-cell calibration. This is possible due to the proximity of antennas on the same base station with each other relative to the antennas at other base-stations.

Figure 8:
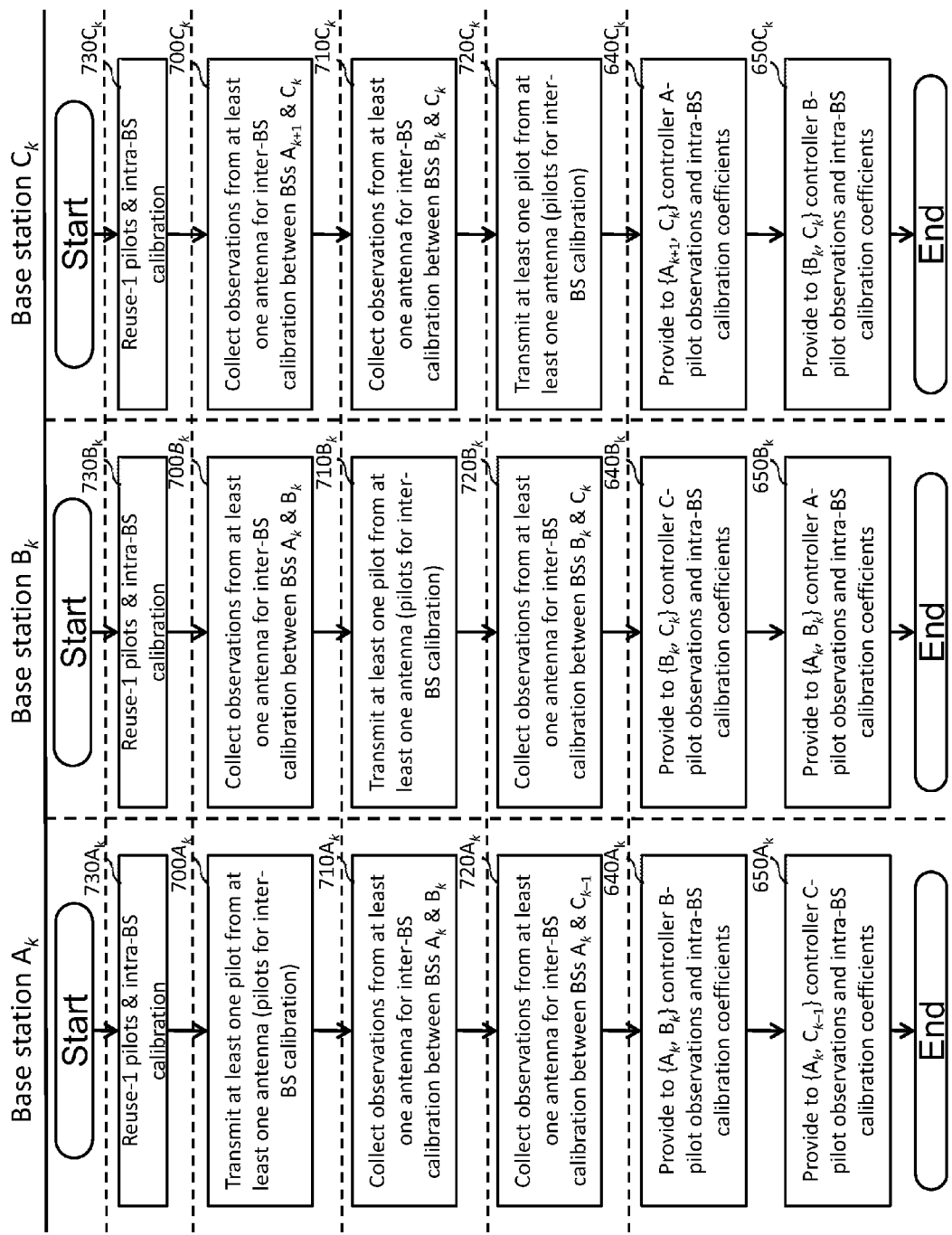
FIG. 8 is a flow diagram of one embodiment of a process for inter-BS calibration based on efficient pilot signaling, which enables network MIMO transmission on the network of FIG. 6.

FIG. 8 is a flow diagram of one embodiment of a process for inter-BS calibration based on this type of efficient pilot signaling that can enable network MIMO transmission over the 1D topology shown in FIG. 6. The process is performed by processing logic that may comprise hardware (circuitry, dedicated logic, etc.), software (such as is run on a general purpose computer system or a dedicated machine), or a combination of both. In one embodiment, the process is performed by calibration processors (e.g., calibration processor 290 of FIG. 1) in cooperation with the transceiver units and the other supporting functionalities their respective base stations (e.g., base station 200).

Referring to FIG. 8, when a pilot is transmitted by e.g., antenna 1 on base station $A_k$, (processing block 730$A_k$) a pilot is also transmitted by each of the other base-stations, including the $\{B_j\}$'s (processing block 730$B_k$) and $\{C_j\}$'s (processing block 730$C_k$). This operation corresponds to reuse-1 reference signaling for intra-cell calibration.

In the resource element over which a pilot is transmitted from a single antenna element at BS $A_k$ (during this stage of reuse-1 pilot signaling), the remaining antenna elements on base station $A_k$ pick up observations that can be used for intra-cell calibration with respect to the transmitting antenna element of base station $A_k$ (since the transmission of this antenna element is received at much higher signal levels than interfering pilots simultaneously transmitted from other base stations). The same is true when each of the other antennas transmits from base station $A_k$. Although reuse 1 accomplishes intra-cell calibration, additional pilots are then needed for inter-cell calibration. For example, considering the controller of the $\{A_k, B_k\}$ cluster, additional calibration pilots are required to estimate the single inter-cell calibration coefficient needed to calibrate the (cluster of) antennas at base station $A_k$ with the (cluster of) antennas at base station $B_k$, assuming the intra-cell calibration coefficients are available to the controller (and are accurate) from the preceding intra-cell calibration cycle (which was based on reuse-1 calibration signaling).

As inter-cell calibration can be achieved by estimating only a single inter-cell calibration coefficient in each 2-BS cluster, it can be accomplished by use of a few pilot transmissions from each BS at sufficiently high reuse factors. Given D transmissions per BS with reuse R', the total number of dimensions needed is M+DR'. The flow diagram of FIG. 8 depicts one embodiment of this inter-BS calibration-pilot method, using R'=3. In particular, the A, B, C base stations take turns in transmitting inter-calibration pilots (processing blocks 700Ak, 710Bk, and 720Ck, respectively). When a BS is not transmitting, it collects observations for inter-BS calibration with one of its neighboring BSs. For example, during the transmission of pilots from the A base-stations (processing blocks $700A_j$ for all j) BS $B_k$ receives observations that can be used to calibrate for its two-BS cluster MU-MIMO transmission with BS $A_k$ (processing block $700B_k$), while at the same time BS $C_k$ receives observations that can be used to calibrate for its two-BS cluster MU-MIMO transmission with BS $A_{k+1}$ (processing block $700C_k$). Typically, sufficiently accurate calibration can be achieved with D values as low as 1-2, and R' values as low as 4. For example, with M=100 antenna elements per base-station, R'=5 and D=4, this method requires 120 dimensions for calibration. In contrast, the method using common calibration-training signaling for both intra and inter-cell calibration would require at least 300 dimensions (since it requires RM dimensions with R≥3). The benefits of this embodiment are more evident in 2D involving network MIMO transmission from 3-BS clusters. Indeed, the first method, relying on a common intra- and inter-cell calibration cycle, would require at least 700 dimensions for calibration (since a reuse factor of R=7 is required at a minimum to enable inter-cell calibration). In contrast, the method that uses reuse-1 signaling for intra-cell calibration, and selective signaling for inter-cell calibration, can enable calibration with as few as M+D×R'=100+1×7=107 dimensions. Even if the parameter values are set D=2 and R'=19 for improved inter-cell calibration accuracy, this would require just 138 dimensions, i.e., more than a factor of 5 less than the first method. Finally, after the base stations provide their pilot observations to the corresponding controllers, the controllers perform inter-calibration procedure as described in FIG. 5 (processing block 500).

In one embodiment, the intra-calibration signaling (depicted by processing blocks $730A_k$, $730B_k$, and $730C_k$) occurs after the inter-calibration signaling. In one embodiment, intra-calibration signaling process occurs less (or more) frequently than inter-calibration signaling. In an alternative embodiment, the intra-calibration signaling in processing block $730B_k$, uses different resources than in processing blocks $730A_k$, and $730C_k$. In one embodiment, the resources used for intra-calibration signaling at processing block $730B_k$, are used at neighboring base-stations $A_k$ and $C_k$ for data transmission, with possibly different transmission powers than the one used for the intra-calibration pilots at base station $B_k$.

Other Embodiments

One set of embodiments involves the use of sequential signaling for hierarchical calibration. The following example illustrates the use of the techniques set forth herein.

Example

Figure 9:
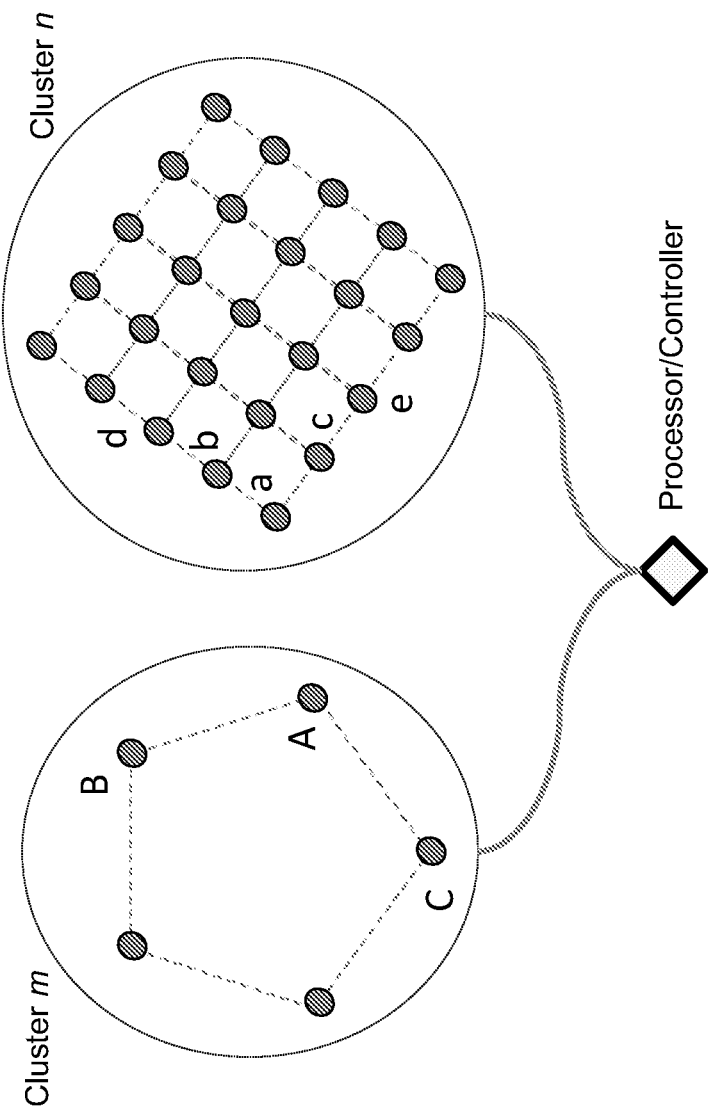
FIG. 9 illustrates an example of inter-cluster calibration involving two clusters where intra-cluster calibrations have already taken place.

Consider a scenario involving inter-cluster calibration of clusters m and n as shown in FIG. 9. It is assumed that intra-cluster calibration has already taken place.

Figure 10:
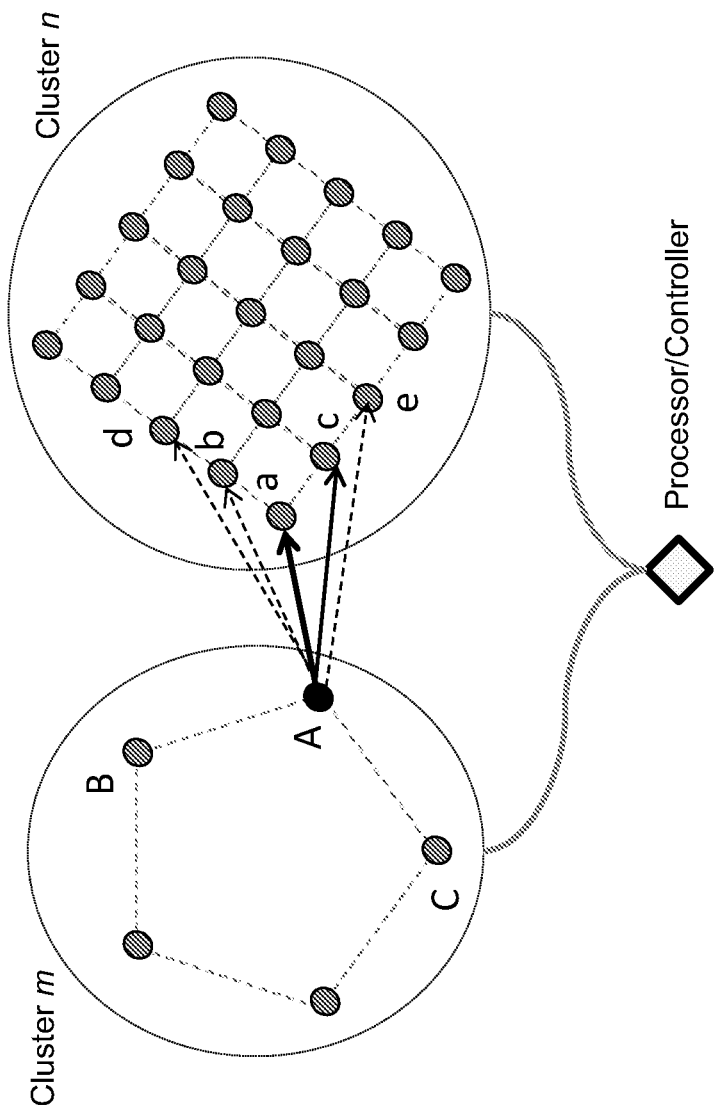
FIG. 10 illustrates a controller that initiates transmission of a pilot from antenna node "A" in cluster m.

Node "A" from cluster m transmits a pilot first, as shown in FIG. 10. This pilot is received at high signal strength (RSS) levels only at nodes "a" and "b". In particular, the RSS at node "a" is the highest.

Figure 11:
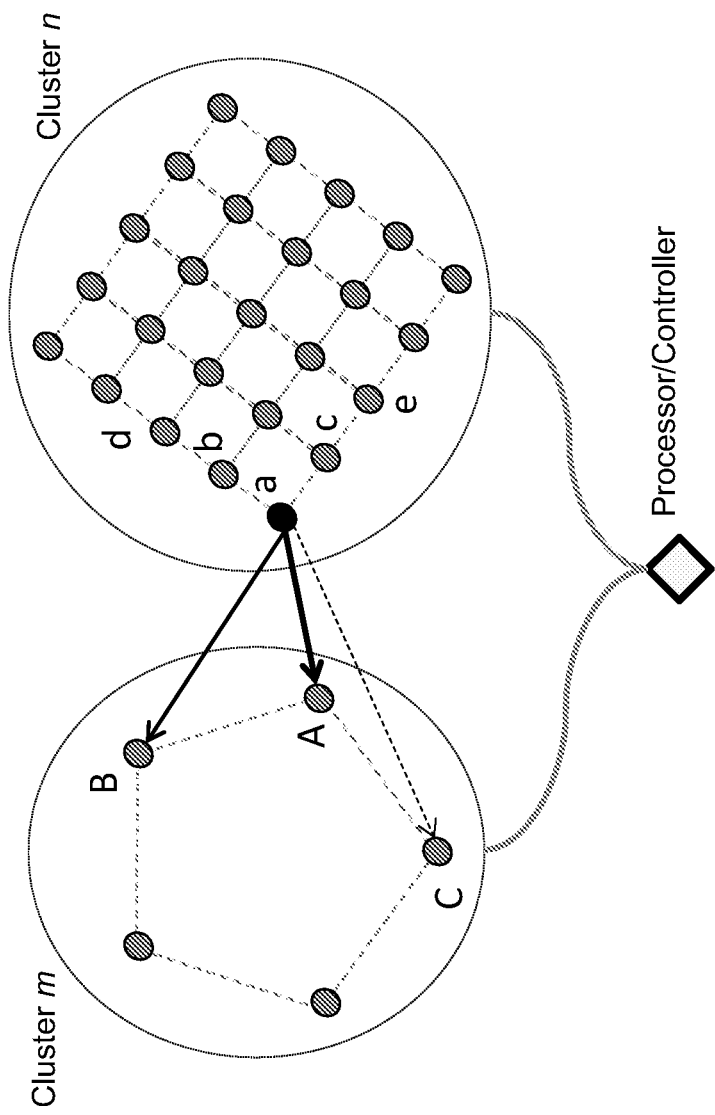
FIG. 11 illustrates a controller that initiates transmission of a pilot from node "a".

In one embodiment, illustrated in FIG. 11, node "a" subsequently transmits a pilot, which is received at sufficiently high strength only at node "A" (by reciprocity) and at node "B".

In one embodiment, illustrated in FIG. 12, "B" subsequently transmits a pilot, which by channel reciprocity is received at sufficiently high strength at node "a".

Figure 12:
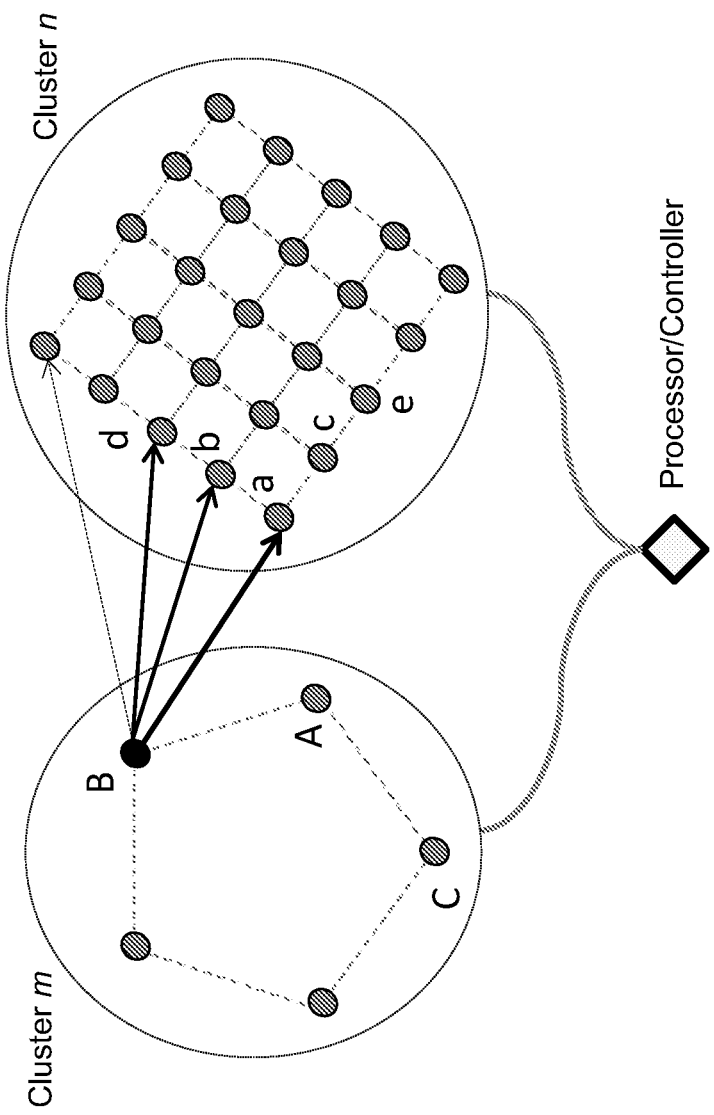
FIG. 12 illustrates a controller that initiates pilot transmission from node B.

In one embodiment, the controller terminates the signaling after the completion of the operation in FIG. 12, and uses the existing pairs of reliable two-way measurements for calibration. The inter-cluster calibration problem is pictorially depicted in FIG. 13.

Figure 13:
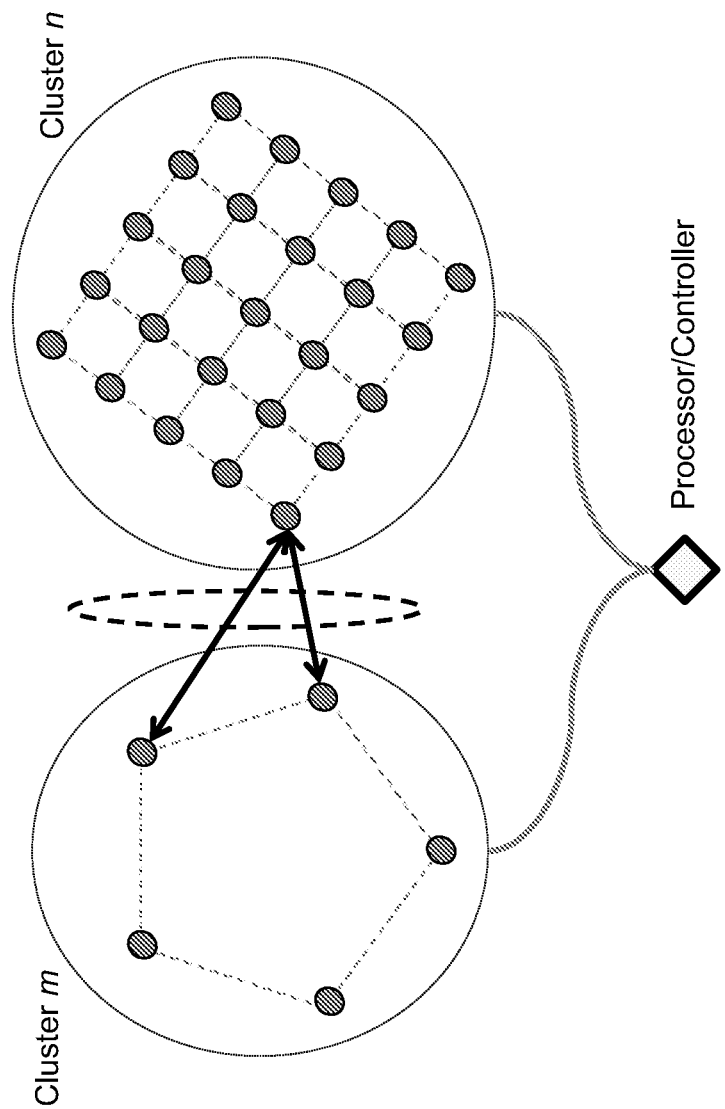
FIG. 13 is a pictorial description of the calibration problem based on the two-way measurements collected based on the pilots transmitted by nodes "A", "a", and "B" as shown in FIG. 10, FIG. 11 and FIG. 12 respectively.
Figure 14:
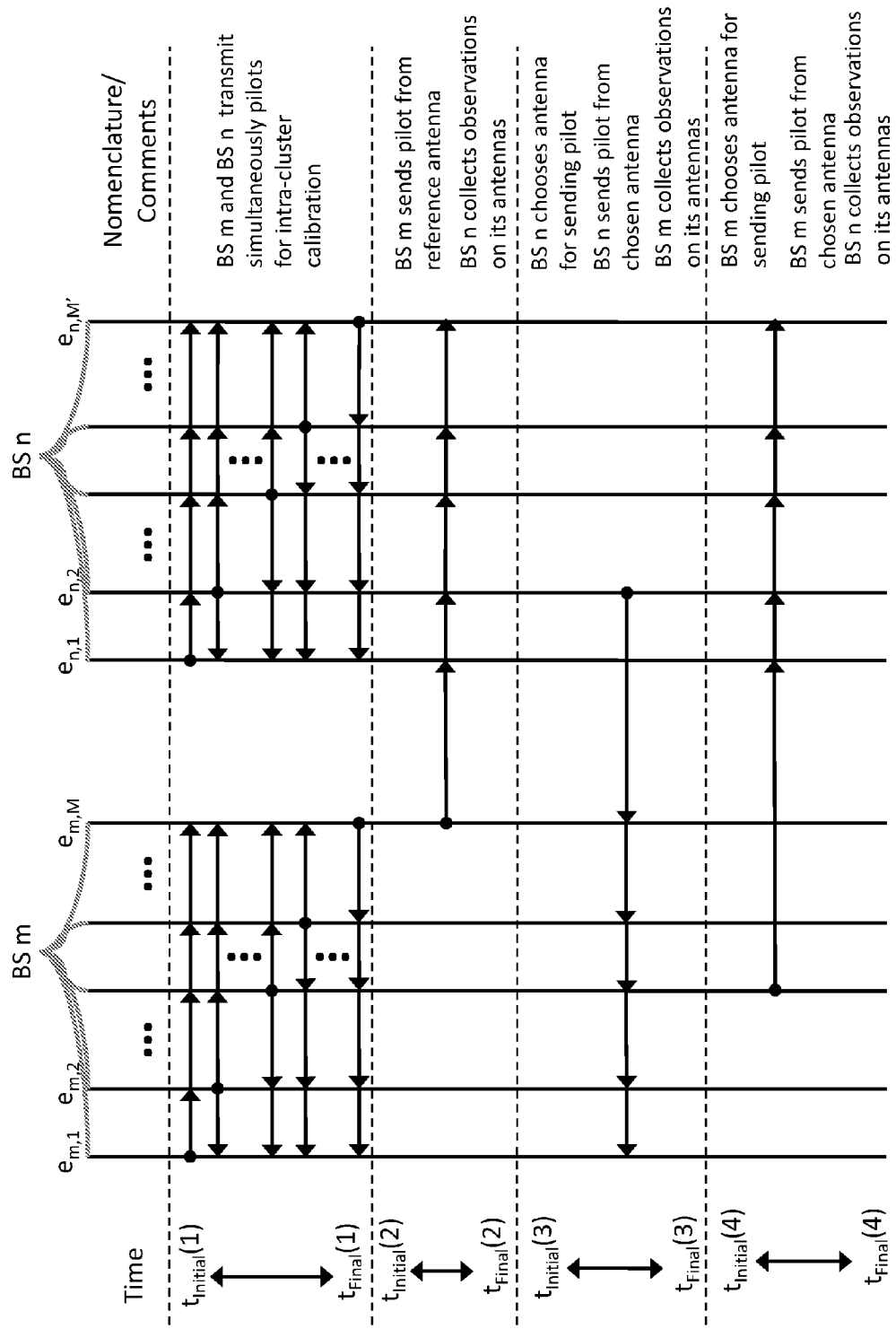
FIG. 14 illustrates timing diagram describing reference signaling for the calibration example in FIG. 10-13.

FIG. 14 is a timing diagram for the intra- and inter-calibration example illustrated in FIG. 13. Referring to FIG. 14, during some interval $[t_{Initial}(1), t_{Final}(1)]$, both clusters perform intra-cluster calibration. In one embodiment, the two clusters transmit pilots from their respective antennas on the same time and frequency slots, but at sufficiently low power so that the inter-cluster interference does not limit the quality of intra-cluster calibration. In one embodiment, at least one of the pilots is transmitted from one cluster on a time-frequency slot where no pilots are transmitted from the other cluster.

FIG. 14 also shows three intervals during which reference signals for inter-cluster calibration are transmitted. More specifically, during some interval $[t_{Initial}(2), t_{Final}(2)]$, base station m sends a pilot from a reference antenna, and base station n collects observations on its antennas. During some interval $[t_{Initial}(3), t_{Final}(3)]$, base station n chooses a antenna for sending a pilot, base station n sends a pilot from the chosen antenna, and base station m collects observations on its antennas. During some interval $[t_{Initial}(4), t_{Final}(4)]$, base station m chooses a antenna for sending a pilot, base station m sends a pilot from the chosen antenna, and base station n collects observations on its antennas.

In one embodiment, $t_{Final}(1) < t_{Initial}(k)$ for k>1, that is, intra-cluster reference signaling in completed prior to inter-cluster reference signaling. In one embodiment, $t_{Final}(k) < t_{Initial}(1)$ for k>1, that is, inter-cluster reference signaling in completed prior to intra-cluster reference signaling. In one embodiment, intra- and inter-cluster reference signaling overlap in time.

Figure 15:
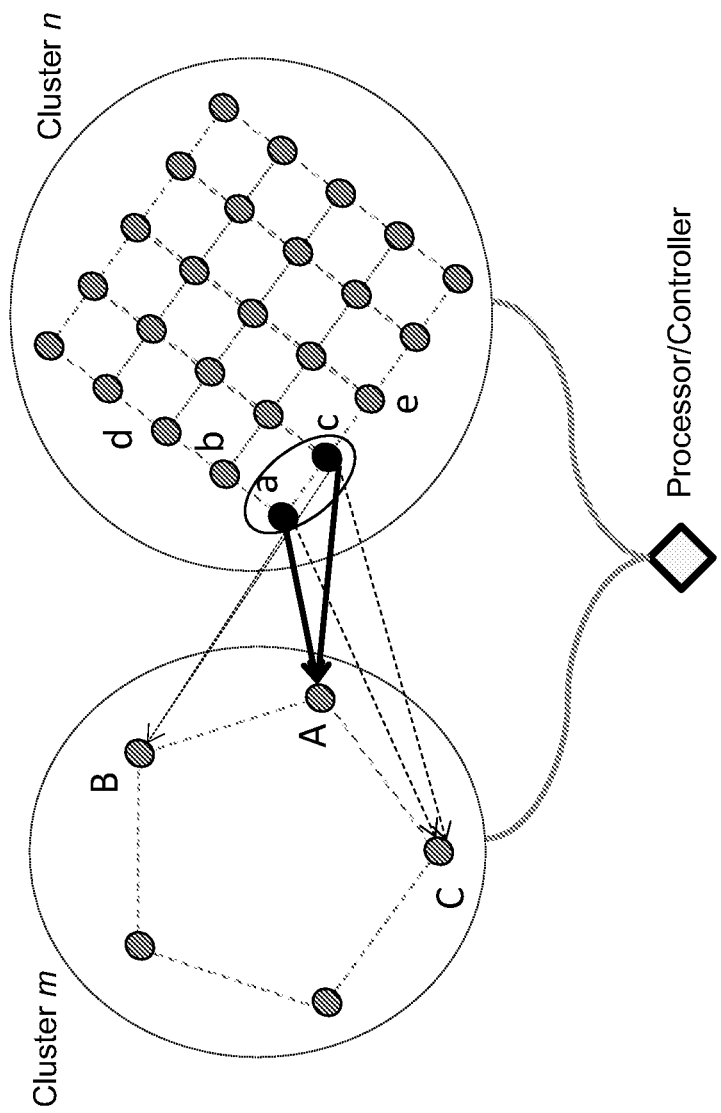
FIG. 15 illustrates pilot calibration beam transmission across node pair "a" and "c", and measurement collection by a controller from node A.

In one embodiment, subsequent to transmission of the node "A" that is shown in FIG. 10, the controller transmits a pilot on a beam formed across the (pre-calibrated) pair of nodes "a", "c" in cluster n, as shown in FIG. 15.

In one embodiment, the pilot is sent on a beam formed by using as beam weight at each of the two nodes the conjugate of the received signal, adjusted by the relative pre-calibration coefficient between elements "a" and "c" so as to induce beamforming at node A. Consider a scenario, such as e.g., in FIG. 16, where a node "A" in cluster m (this node is referred to as node with index 0), transmits a pilot that is received at sufficient large RSS power at K nodes in cluster n (in the example in FIG. 16, K=2). These K nodes are indexed from 1 to K (e.g. node "a" is node 1 and node "c" is node K=2). It is assumed that these K nodes have been calibrated sufficiently well relative to one another, i.e., $c_k = a_k c_1$, for some known $a_k$ but with $c_1$ unknown. This means that $$\vec{r}_k \approx c_1 a_k \vec{t}_k$$

Using this, the observation at node k, in response to the pilot from node 0, is given by $$y_{k0} = \vec{r}_k h_{k0} \vec{t}_0 + w_{k0} \approx c_1 a_k \vec{t}_k h_{k0} \vec{t}_0 + w_{k0}$$

where $h_{k0}$ denotes the physical channel between antenna element 0 and antenna element k. Then nodes 1 through K send pilots simultaneously and their superposition is received at node 0:

$$y_{0[1-K]} = \tilde{r}_0 \sum_{k=1}^{K} \tilde{t}_k h_{k0} p_k + w_0$$

where $w_0$ represents noise, and $p_k$ is the pilot transmitted by node k. Now, to find $a_0$ where $c_0 = a_0 c_1$, the following may be used:

$$\frac{y_{0[1-K]}}{\sum_{k=1}^{K} \beta_k y_{k0}},$$

provided $$\beta_k a_k = p_k$$

This is because, ignoring noise, we have $$\frac{y_{0[1-K]}}{\sum_{k=1}^{K} \beta_k y_{k0}} = \frac{c_0}{c_1} \frac{\sum_{k=1}^{K} p_k h_{k0} t_k}{\sum_{k=1}^{K} p_k h_{k0} t_k}$$

$$= a_0$$

In practice, to combat noise, the pilot weights can be chosen so as to maximize the receive SNR in the second channel (the simultaneous transmission of the K pilots). Ideally, $p_k$ would be picked to be proportional to the conjugate of $h_{k0} t_k$. Unfortunately that requires knowledge of the $t_k$'s. In practice, one can get close to this pilots choice, by picking $p_k$ proportional to the conjugate of "$y_{k0}$ divided by $a_k$" (i.e., we first pre-calibrate by dividing with $a_k$, and then conjugate, and use the resulting coefficient as the pilot), since this quantity equals, in the absence of noise, $h_{k0} t_k$.

The two sets of transmissions in FIG. 10, and FIG. 15, allow calibration of the network based on a single pair of measurements. This is pictorially depicted in FIG. 16.

Figure 16:
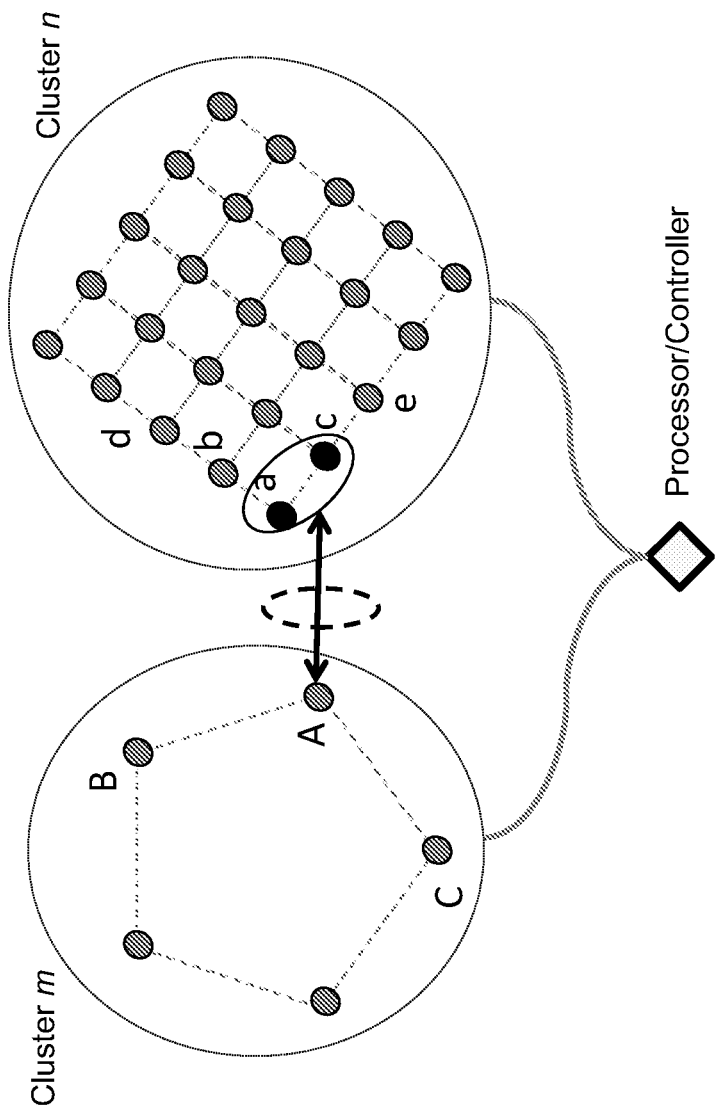
FIG. 16 is a pictorial representation of an inter-cluster calibration problem resulting from the signaling cycles shown in FIG. 10 and FIG. 15.
Figure 17:
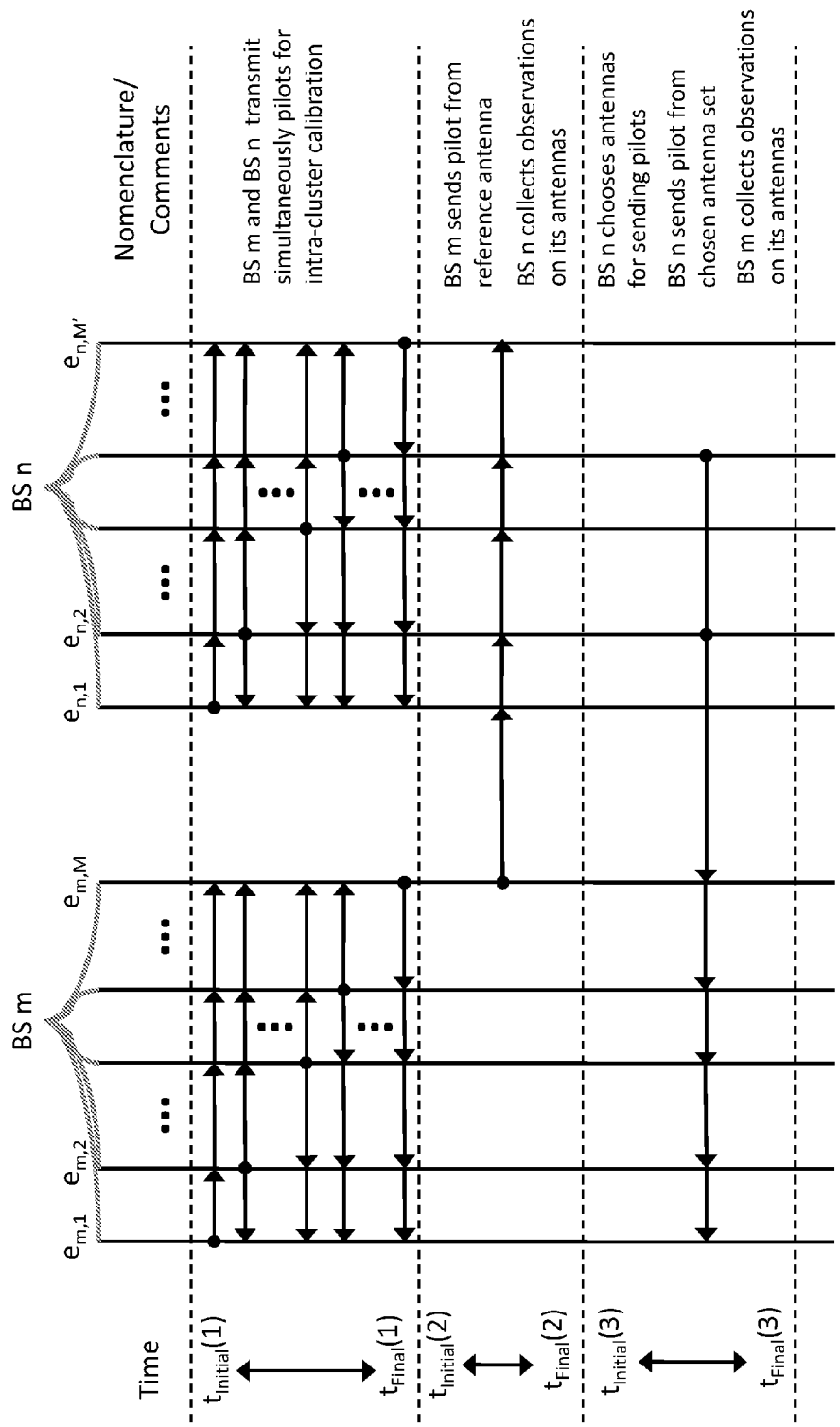
FIG. 17 is a timing diagram for the calibration example shown in FIG. 10, FIG. 15 and FIG. 16.

FIG. 17 is a timing diagram associated with the calibration sequence depicted in FIG. 10, FIG. 15, and FIG. 16. Referring to FIG. 17, during some interval [$t_{Initial}(1)$, $t_{Final}(1)$], both clusters perform intra-cluster calibration. In one embodiment, the two clusters transmit pilots from their respective antennas on the same time and frequency slots, but at sufficiently low power so that the inter-cluster interference does not limit the quality of intra-cluster calibration. In one embodiment, at least one of the pilots is transmitted from one cluster on a time-frequency slot where no pilots are transmitted from the other cluster. In interval [$t_{Initial}(2)$, $t_{Final}(2)$], one antenna (a reference antenna) from the first cluster (cluster m is chosen as the first cluster in FIG. 17) transmits a pilot signal, which will be received at different strength at different antennas of the second cluster (cluster n is the second cluster in FIG. 17). Then the second cluster uses more than one antenna element, selected for example according to their RSS, to beamform to the first cluster's transmitting antenna. In one embodiment, this signaling procedure can be repeated many times with different transmit antennas of the first cluster. In interval [$t_{Initial}(3)$, $t_{Final}(3)$], cluster n (base station) chooses antennas for sending pilots and sends a pilot signal from each antenna in the set, which will be received at different strength at different antennas of the first cluster (cluster m). Then the first cluster (cluster m) uses more than one antenna element to collect observations.

In one embodiment, intra-calibration, [$t_{Initial}(1)$, $t_{Final}(1)$], can be done after inter calibration signaling i.e. interval [$t_{Initial}(2)$, $t_{Final}(2)$] followed by interval [$t_{Initial}(3)$, $t_{Final}(3)$].

Figure 18:
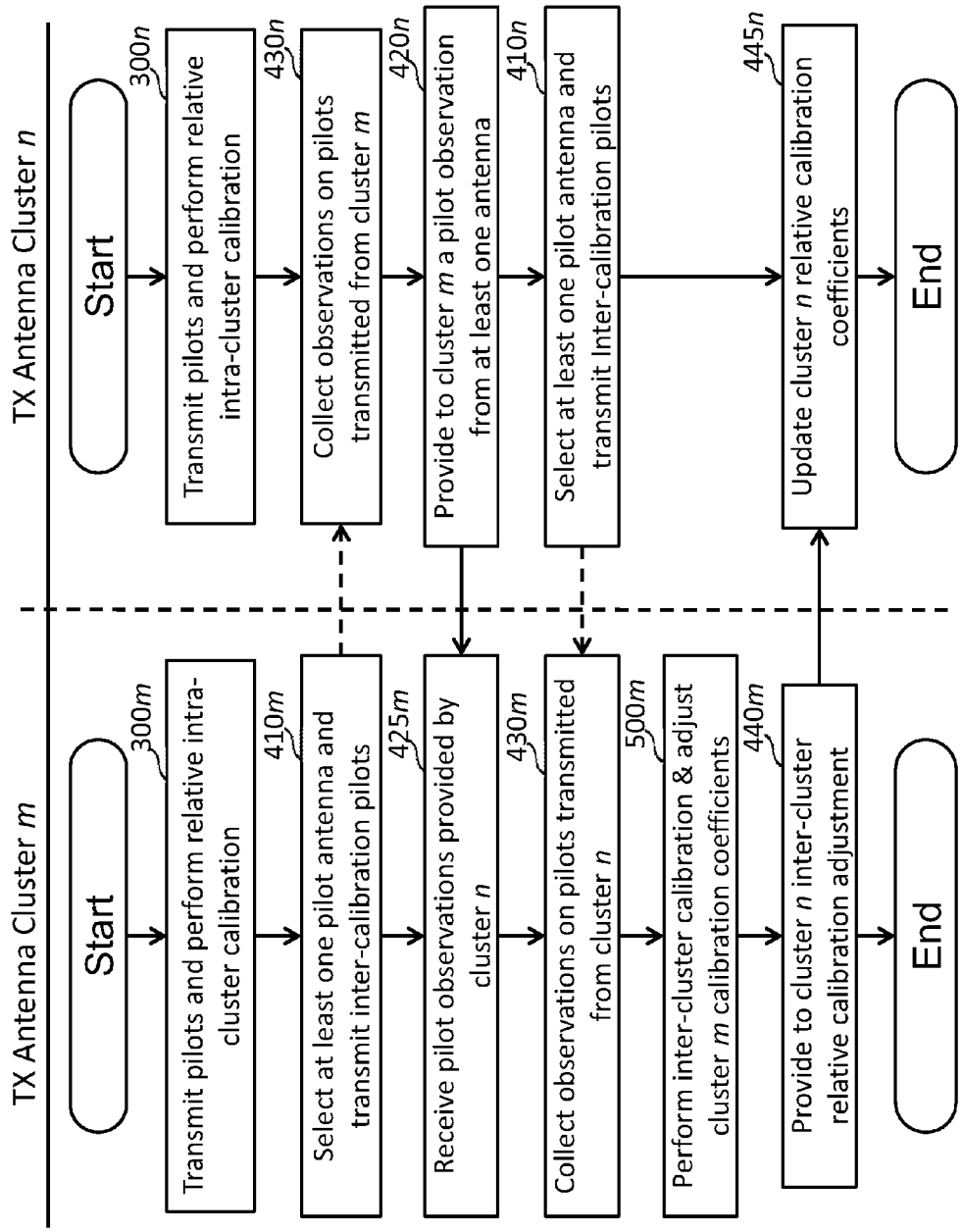
FIG. 18 is a flow diagram of one embodiment of a process for the hierarchical calibration methods in FIG. 13 and FIG. 16.

FIG. 18 is a flow diagram of one embodiment of a process for sequential inter-calibration techniques illustrated in FIG. 13 and FIG. 16. The process is performed by processing logic that may comprise hardware (circuitry, dedicated logic, etc.), software (such as is run on a general purpose computer system or a dedicated machine), or a combination of both. In one embodiment, the process is performed by calibration processors (e.g., calibration processor 290 of FIG. 1) in cooperation with the transceiver units and the other supporting functionalities their respective base stations (e.g., base station 200).

Referring to FIG. 18, each cluster (cluster m and n in FIG. 18) performs intra-calibration in processing blocks 300m and 300n. For the initial pilot transmission from the first cluster to the second cluster, at least one antenna is selected from the first cluster (cluster m is chosen as the first cluster in the flow diagram, as shown by processing block 410m).

Upon receiving pilots, the second cluster chooses one or many antennas to transmit inter-calibration pilot signals (processing block 410n) and transmits the inter-calibration pilot signals. In one embodiment, this transmission occurs fast enough with respect to the initial pilot transmission, so that they are both within the coherence time of the channel between the two antennas. In an alternative embodiment, this transmission occurs and also a replica transmission of the initial pilot transmission occurs, with such timing that they are both within the coherence time of the channel between the two antennas. Besides collecting observations on the transmitted pilot signals over the air (processing block 430n), the second cluster also provides its own pilot observations to the first cluster as seen in processing block 420n. Although this step is in principle performed via a wired connection, it can also be provided via a wireless data transmission.

The first cluster, m, receives the pilot observations provided by the second cluster, n, (processing block 425m). Upon receiving pilot observations, the first cluster performs inter-cluster calibration and adjusts its calibration coefficients (processing block 500m). The first cluster also provides relative calibration adjustment to the second cluster (processing block 440m). In response to the cluster n inter-cluster relative calibration adjustment, processing logic of cluster m updates cluster n relative calibration coefficients (processing block 445n). In the embodiment shown in the figure, cluster n performs relative calibration of its RF chains with respect to cluster m. The calibration adjustment corresponds to computing a quantity $\alpha_n$ in the manner described in [0082]-[0084]. The corresponding quantity $\alpha_m$ in cluster m, is set to 1, since cluster m is treated as the reference cluster.

In one embodiment, processing blocks 410m, 430n, 425m, 420n, 430m, 410n can be repeated many times.

The following embodiments enable calibration of a large network of arrays by means of layered clustering and calibrations. In one embodiment, calibration involves a sequence of pilot transmission and calibration operations, resulting in generating sequentially larger clusters of calibrated arrays. In one example, first pilots are transmitted with reuse density $d_1$, and pilot power $P_1$, to train small isolated clusters of antenna; then a second set of pilots are transmitted with pilot power $P_2$ (e.g., $P_2 > P_1$) and density $d_2$ (e.g., $d_2 < d_1$). Measurements from the second set of pilots allow increasing the size of calibrated clusters. In one embodiment of the second reference-signaling cycle for calibration, at least one of the antennas transmitting the pilots is determined based on calibration outcomes from round 1. In one embodiment, $P_k$ may be varied across the field. In one embodiment, pilot beams may be transmitted simultaneously from multiple antennas.

The following embodiments consider calibration "on demand." In one embodiment, an additional step of calibration is triggered by a user terminal's uplink pilots, signifying that clusters, each cluster having available intra-cluster calibration coefficients (but with no inter-cluster calibration available), should be used for joint signaling to the user terminal. In one embodiment, this is determined by means of the RSS in the uplink at the receiving antenna elements at the time of the UL pilots. In one embodiment, user-terminal uplink pilots can be also used to trigger a refreshment procedure on intra or inter calibrations. In one embodiment, additional (helper) antenna nodes can be used to assist in the on-demand calibration procedure. These nodes maybe outside the serving cluster, and may have a very low RSS to the user terminal in question.

In embodiments described herein, the task of signaling and calibration of one or more clusters of antennas was presented as though it is controlled by a single processor entity. However, as the "helper" node suggests, helper nodes can enable other forms of distributed calibration. In one embodiment, different controllers engaged in calibrating their own clusters of possibly (but not necessarily) overlapping sets of antenna elements, exchange information providing "helper node" information with each other to assist in each other's calibration efforts. In one embodiment, this is cluster-driven, on demand, and is only be used in one direction.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for calibrating a plurality of transceiver units in an entity, the plurality of transceiver units including more than two transceiver units, each unit including an antenna element, for their use for joint transmission from the entity to at least one wireless entity, the method comprising:
generating a plurality of processed observations corresponding to pilots transmitted by transceiver units in the entity and observations of the pilots by transceiver units in the entity, wherein each of the pilots is transmitted one at a time, with one of the pilots being transmitted by a distinct one transceiver unit of the plurality of transceiver units and being observed by transceiver units in the plurality of transceiver units other than the one transceiver unit, such that transmission of each pilot of the plurality of pilots produces observations, wherein at least two pilot transmissions occur in which at least one transceiver unit of the plurality of transceiver units sends a single pilot and at least two observations are received at different transceiver units of the plurality of transceiver units for use in calibration, each processed observation being indicative of a combined response of a pilot transmitted by transmitter hardware of one transceiver unit at the entity and an observation of the pilot by receiver hardware of another transceiver unit at the entity;
grouping the plurality of processed observations into one or more observation pairs, where each observation pair of the one or more observation pairs comprises: a first observation indicative of a combined response between transmitter hardware of a first transceiver unit and receiver hardware of a second transceiver unit in the entity, and a second observation indicative of a combined response between transmitter hardware of the second transceiver unit and receiver hardware of the first transceiver unit in the entity;
calculating, based on a selected set having at least one of the one or more observation pairs, relative calibration values, where each relative calibration value is associated with a transceiver of each transceiver unit and is relative with respect to a transceiver of a reference unit at the entity,
wherein the relative calibration values comprise estimates of relative calibration coefficients between the transceiver of each transceiver unit and the transceiver of the reference unit, and wherein a relative calibration coefficient of one of the transceiver units comprises the ratio of a calibration coefficient of the one transceiver unit over the ratio of a calibration coefficient of the reference unit; and
calibrating at least one of the plurality of transceiver units using at least one of the relative calibration values.

2. The method defined in claim 1 further comprising: transmitting at least one pilot from each transceiver unit in the entity using its antenna element; receiving one or more observations at each transceiver unit in the entity using its antenna, each of the one or more observations corresponding to receipt of the at least one pilot being transmitted from one or more other transceiver units in the entity.

3. The method defined in claim 1 wherein each relative calibration coefficient is a calibration coefficient for the transceiver of each transceiver unit that is relative to the calibration coefficient for the transceiver of the reference unit.

4. The method in claim 3 where the calibration coefficient of the one transceiver unit is defined as the ratio of transmitter gain of the one transceiver unit over receiver gain of the one transceiver unit.

5. The method in claim 3 wherein the estimates of the relative calibration coefficients are based on the effect of their values on an error metric, wherein the error metric is a function of individual error quantities, each individual error quantity based on a function of the two observations in an individual observation pair.

6. The method in claim 5 further comprising selecting the relative calibration coefficients as values that minimize the error metric, wherein the error metric is a sum of the squares of the individual error quantities, and wherein each of the individual error quantities is based on an individual pair and is a linear combination of the observations in the pair.

7. The method in claim 5 wherein calculating the relative calibration values is based on prior calibration estimates.

8. The method defined in claim 3 further comprising determining a channel matrix comprising channel vectors, each vector comprising scalars collectively representing the channel coefficients between the transceivers of a plurality of transceiver units in the entity and the transceiver unit of a user terminal equipment, using the estimates of relative calibration coefficients; determining a precoder based on the channel matrix and relative calibration coefficient estimates; and using the precoder to transmit data to the user terminals.

9. The method defined in claim 1 wherein the first entity is a base station.

10. A base station comprising:
a plurality of transceivers, the plurality of transceiver units including more than two transceiver units, with each transceiver of the plurality of transceivers comprising an antenna element;
a calibration processor coupled to the plurality of transceivers, the calibration processor operable to
generate a plurality of processed observations corresponding to pilots transmitted by transceiver units in the entity and observations of the pilots by transceiver units in the entity, wherein each of the pilots is transmitted one at a time, with one of the pilots being transmitted by a distinct one transceiver unit of the plurality of transceiver units and being observed by transceiver units in the plurality of transceiver units other than the one transceiver unit, such that transmission of each pilot of the plurality of pilots produces observations, wherein at least two pilot transmissions occur in which at least one transceiver unit of the plurality of transceiver units sends a single pilot and at least two observations are received at different transceiver units of the plurality of transceiver units for use in calibration, each processed observation being indicative of a combined response of a pilot transmitted by transmitter hardware of one transceiver unit at the entity and an observation of the pilot by receiver hardware of another transceiver unit at the entity;
group the plurality of processed observations into one or more observation pairs, where each observation pair of the one or more observation pairs comprises a first observation indicative of a combined response between transmitter hardware of a first transceiver unit and receiver hardware of a second transceiver unit of the plurality of transceivers, and a second observation indicative of a combined response between transmitter hardware of the second transceiver unit and receiver hardware of the first transceiver unit;
calculate, based on a selected set having at least one of the one or more observation pairs, relative calibration values, where each relative calibration value is associated with a transceiver of each transceiver unit and is relative with respect to a transceiver of a reference unit at the base station,
wherein the relative calibration values comprise estimates of relative calibration coefficients between the transceiver of each transceiver unit and the transceiver of the reference unit, and wherein a relative calibration coefficient of one of the transceiver units comprises the ratio of a calibration coefficient of the one transceiver unit over the ratio of a calibration coefficient of the reference unit; and
calibrating at least one of the plurality of transceiver units using at least one of the relative calibration values.

11. The base station defined in claim 10 wherein the calibration processor is further operable to control the antenna element of each transceiver unit to transmit at least one pilot and to control the antenna elements of the plurality of transceiver units to receive one or more observations, each of the one or more observations received by one transceiver unit corresponding to receipt of the at least one pilot being transmitted from one or more other transceiver units in the plurality of transceivers.

12. The base station in claim 11 where the calibration coefficient of the one transceiver unit is defined as the ratio of transmitter gain of the one transceiver unit over receiver gain of the one transceiver unit.

13. The base station in claim 11 wherein the estimates of the relative calibration coefficients are based on the effect of their values on an error metric, wherein the error metric is a function of individual error quantities, each individual error quantity based on a function of the two observations in an individual observation pair.

14. The base station in claim 13 wherein the calibration processor is further operable to select the relative calibration coefficients as values that minimize the error metric, wherein the error metric is a sum of the squares of the individual error quantities, and wherein each of the individual error quantities is based on an individual pair and is a linear combination of the observations in the pair.

15. The base station in claim 13 wherein the calibration processor calculates the relative calibration values based on prior calibration estimates.

16. The base station defined in claim 11 wherein the calibration processor is further operable to determine a channel matrix of channel vectors, each vector comprising scalars collectively representing the channel coefficients between the transceivers of a plurality of transceiver units in the entity and the transceiver unit of a user terminal equipment, using the estimates of relative calibration coefficients; determining a precoder based on the channel matrix and relative calibration coefficient estimates; and using the precoder to transmit data to the user terminals.

17. The base station defined in claim 10 wherein each of the transceivers comprise:
a plurality of modulation units coupled to the plurality of antennas to perform modulation for signals being transmitted by the plurality of antennas; and
a plurality of demodulation units coupled to the plurality of antennas to perform demodulation for signals being received by the plurality of antennas.

18. The base station defined in claim 17 further comprising:
a transmit MIMO processor coupled to the plurality of modulation units to generate signals for transmission;
a MIMO detector coupled to receive signals from the plurality of demodulation units; and
a receive processor coupled to the MIMO detector to process signals from the MIMO detector.

19. An article of manufacture having one or more non-transitory computer readable media storing instructions thereon which, when executed by an entity, cause the entity to perform a method for calibrating a plurality of transceiver units of the entity, the plurality of transceiver units including more than two transceiver units, with each unit including an antenna element, the method comprising:
control the antenna element of each transceiver unit to transmit at least one pilot, such that the plurality of transceiver units transmits a plurality of pilots;
control the antenna elements of the plurality of transceiver units to receive one or more observations, wherein each of the plurality of pilots is transmitted one at a time, with one pilot of the plurality of pilots being transmitted by a distinct one transceiver unit of the plurality of transceiver units and being observed by transceiver units in the plurality of transceiver units other than the one transceiver unit, such that transmission of each pilot of the plurality of pilots produces observations, wherein at least two pilot transmissions occur in which at least one transceiver unit of the plurality of transceiver units sends a single pilot and at least two observations are received at different transceiver units of the plurality of transceiver units for use in calibration, each of the one or more observations received by one transceiver unit corresponding to receipt of the at least one pilot being transmitted from one or more other transceiver units in the plurality of transceivers;

generate a plurality of processed observations, each processed observation being indicative of a combined response between transmitter hardware of one transceiver unit at the first entity and receiver hardware of another transceiver unit at the first entity;

group the plurality of processed observations into one or more observation pairs, where each observation pair of the one or more observation pairs comprises: a first observation indicative of a combined response between transmitter hardware of a first transceiver unit and receiver hardware of a second transceiver unit in the first entity, and a second observation indicative of a combined response between transmitter hardware of the second transceiver unit and receiver hardware of the first transceiver unit in the first entity;

calculate, based on a selected set having at least one of the one or more observation pairs, relative calibration values, where each relative calibration value is associated with a transceiver of each transceiver unit and is relative with respect to a transceiver of a reference unit at the first entity, wherein the relative calibration values comprise estimates of relative calibration coefficients between the transceiver of each transceiver unit and the transceiver of the reference unit, and wherein a relative calibration coefficient of one of the transceiver units comprises the ratio of a calibration coefficient of the one transceiver unit over the ratio of a calibration coefficient of the reference unit; and calibrate at least one the plurality of transceiver units using at least one of the relative calibration values.

20. A method for jointly calibrating first and second separate groups of one or more transceiver units in a communication system, each transceiver unit in the first and second groups including an antenna element, the method comprising:

generating a plurality of processed observations corresponding to at least one pilot transmitted by each transceiver unit in the first group at different times and observations of pilots from transceiver units in the first group by multiple transceiver units in the second group, such that transmission of each pilot transmitted by said each transceiver unit in the first group produces observations, and at least one pilot transmitted by each transceiver unit in the second group at different times and observations of pilots from transceiver units in the second group by multiple transceiver units in the first group, such that transmission of each pilot transmitted by said each transceiver unit in the second group produces observations, wherein at least two pilot transmissions occur in which at least one transceiver unit of the first group sends a single pilot and at least two observations are received at different transceiver units of the second group for use in calibration, and wherein each of the plurality of processed observations is indicative of either a combined response of a pilot transmitted by transmitter hardware of one transceiver unit in the first group and an observation of the pilot by receiver hardware of another transceiver unit in the second group or a combined response of a pilot transmitted by transmitter hardware of one transceiver unit in the second group and an observation of the pilot by receiver hardware of another transceiver unit in the first group;

grouping the plurality of processed observations into one or more observation pairs, where each observation pair of the one or more observation pairs comprises: a first observation indicative of a combined response between transmitter hardware of a first transceiver unit in the first group and receiver hardware of a second transceiver unit in the second group, and a second observation indicative of a combined response between transmitter hardware of the second transceiver unit in the second group and receiver hardware of the first transceiver unit in the first group;

calculating, based on a selected set having at least one of the one or more observation pairs, estimates of relative calibration values, where each relative calibration value is associated with a transceiver of each transceiver unit in the first and second groups and is relative with respect to a transceiver of a reference unit, wherein the relative calibration values comprise estimates of relative calibration coefficients between the transceiver of each transceiver unit and the transceiver of the reference unit, and wherein a relative calibration coefficient of one of the transceiver units comprises the ratio of a calibration coefficient of the one transceiver unit over the ratio of a calibration coefficient of the reference unit; and calibrating at least one of the transceiver units using at least one of the relative calibration values.

21. The method defined in claim 20 further comprising:
transmitting at least one pilot by the at least one transceiver unit in the first group;
receiving observations of the at least one pilot by the at least one transceiver unit in the second group;
transmitting at least one pilot by the at least one transceiver unit in the second group; and
receiving observations of the at least one pilot by the at least one transceiver unit in the first group.

22. The method defined in claim 20 wherein the estimates of relative calibration values comprise relative adjustment values, and further comprising adjusting calibration coefficients of each antenna in transceiver units in the first and second groups using one or more of the calibration adjustment values.

23. The method defined in claim 20 further comprising selecting at least one pair of the one or more observation pairs based on one selected from a group consisting of RSS threshold values, a constraint on a number of pairs that may be selected, and complexity of a calibration algorithm.

24. The method defined in claim 20 wherein calculating the estimates of relative calibration values is based on a least squares method.

25. The method defined in claim 20 further comprising performing calibration of transceiver units within the first group based on processed observations corresponding to pilots transmitted by transceiver units in the first group and observations of the pilots by other transceiver units in the first group.

26. The method defined in claim 20 further comprising:
calibrating a plurality of transceiver units in the first and second groups relative to a first reference unit in the first group.

27. The method defined in claim 26 further comprising:
designating a transceiver unit in the second group as a second reference unit in the second group; and
performing calibration of the second reference unit in the second group relative to the first reference unit in first group.

28. The method defined in claim 27 further comprising:
calibrating transceiver units in the second group relative to the first reference unit as a combined effect of calibrating the second group relative to the local reference and the second reference unit relative to the first reference unit.

29. The method defined in claim 28 calibrating transceiver units in the second group relative to the second reference unit, comprises:
generating a plurality of processed observations corresponding to pilots transmitted by transceiver units in the second group and observations of the pilots by transceiver units in the second group, each processed observation being indicative of a combined response of a pilot transmitted by transmitter hardware of one transceiver unit in the second group and an observation of the pilot by receiver hardware of another transceiver unit in the second group;
grouping the plurality of processed observations into one or more observation pairs, where each observation pair of the one or more observation pairs comprises: a first observation indicative of a combined response between transmitter hardware of a first transceiver unit and receiver hardware of a second transceiver unit in the second group, and a second observation indicative of a combined response between transmitter hardware of the second transceiver unit and receiver hardware of the first transceiver unit in the second group; and
calculating, based on at least one of observation pairs, relative calibration values, where each relative calibration value is associated with a transceiver of each transceiver unit and is relative with respect to a transceiver of the second reference unit at the entity.

30. The method defined in claim 28 wherein calibrating a plurality of transceiver units in the second group relative to the second reference unit occurs prior to calibrating the second reference unit relative to the first reference unit.

31. A communication system comprising:
a first group of transceiver units, each transceiver unit of the first group comprising an antenna element;
a second group of transceiver units, each transceiver unit of the second group comprising an antenna element;
at least one calibration processor coupled to the first and second groups, the calibration processor operable to
generate a plurality of processed observations corresponding to
at least one pilot transmitted by each transceiver unit in the first group at different times and observations of pilots from transceiver units in the first group by multiple transceiver units in the second group, such that transmission of each pilot transmitted by said each transceiver unit in the first group produces observations, and
at least one pilot transmitted by each transceiver unit in the second group at different times and observations of pilots from transceiver units in the second group by multiple transceiver units in the first group, such that transmission of each pilot transmitted by said each transceiver unit in the second group produces observations, wherein at least two pilot transmissions occur in which at least one transceiver unit of the first group sends a single pilot and at least two observations are received at different transceiver units of the second group for use in calibration,
and wherein each of the plurality of processed observations is indicative of either a combined response of a pilot transmitted by transmitter hardware of one transceiver unit in the first group and an observation of the pilot by receiver hardware of another transceiver unit in the second group or a combined response of a pilot transmitted by transmitter hardware of one transceiver unit in the second group and an observation of the pilot by receiver hardware of another transceiver unit in the first group;
group the plurality of processed observations into one or more observation pairs, where each observation pair of the one or more observation pairs comprises:
a first observation indicative of a combined response between transmitter hardware of a first transceiver unit in the first group and receiver hardware of a second transceiver unit in the second group, and a second observation indicative of a combined response between transmitter hardware of the second transceiver unit in the second group and receiver hardware of the first transceiver unit in the first group; and
calculate, based on a selected set having at least one of the one or more observation pairs, estimates of relative calibration values, where each relative calibration value is associated with a transceiver of each transceiver unit in the first and second groups and is relative with respect to a transceiver of a reference unit, wherein the relative calibration values comprise estimates of relative calibration coefficients between the transceiver of each transceiver unit and the transceiver of the reference unit, and wherein a relative calibration coefficient of one of the transceiver units comprises the ratio of a calibration coefficient of the one transceiver unit over the ratio of a calibration coefficient of the reference unit; and
calibrate at least one the plurality of transceiver units in the first group using at least one of the relative calibration values.

32. The system defined in claim 31 wherein the estimates of relative calibration values comprise relative adjustment values, and calibration coefficients of each antenna in transceiver units in the first and second groups are adjusted using one or more of the calibration adjustment values.

33. The system defined in claim 31 wherein the at least one calibration processor is operable to select at least one pair of the one or more observation pairs based on one selected from a group consisting of: RSS threshold values, a constraint on a number of pairs that may be selected, and complexity of a calibration algorithm.

34. The system defined in claim 31 wherein the estimates of relative calibration values are calculated based on a least squares method.

35. The system defined in claim 31 wherein transceiver units within the first group are calibrated based on processed observations corresponding to pilots transmitted by transceiver units in the first group and observations of the pilots by other transceiver units in the first group.

36. The system defined in claim 31 wherein transceiver units in a plurality of transceiver units in the first group are calibrated relative to a reference unit by:

generating a plurality of processed observations corresponding to pilots transmitted by transceiver units in the first group and observations of the pilots by transceiver units in the first group, each processed observation being indicative of a combined response of a pilot transmitted by transmitter hardware of one transceiver unit in the first group and an observation of the pilot by receiver hardware of another transceiver unit in the first group;

grouping the plurality of processed observations into one or more observation pairs, where each observation pair of the one or more observation pairs comprises: a first observation indicative of a combined response between transmitter hardware of a first transceiver unit and receiver hardware of a second transceiver unit in the first group, and a second observation indicative of a combined response between transmitter hardware of the second transceiver unit and receiver hardware of the first transceiver unit in the first group; and calculating, based on at least one of observation pairs, relative calibration values, where each relative calibration value is associated with a transceiver of each transceiver unit and is relative with respect to a transceiver of the reference unit at the entity.

37. The system defined in claim 36 wherein a plurality of transceiver units in the first group is calibrated relative to the reference unit prior to jointly calibrating the first and second groups.

38. An article of manufacture having one or more non-transitory computer readable media storing instructions thereon which, when executed by an entity, cause the entity to perform a method for calibrating first and second groups of transceiver units in an entity, each transceiver unit including an antenna element, the method comprising:

generating a plurality of processed observations corresponding to pilots transmitted by transceiver units in the first group and observations of the pilots by transceiver units in the second group, wherein each of the pilots is transmitted one at a time, with one of the pilots being transmitted by a distinct one transceiver unit of the first and being observed by all transceiver units in the second group, such that transmission of each pilot of the plurality of pilots produces at least two observations, wherein at least two pilot transmissions occur in which at least one transceiver unit of the plurality of transceiver units sends a single pilot and at least two observations are received at different transceiver units of the plurality of transceiver units for use in calibration, each of the plurality of processed observations being indicative of a combined response of a pilot transmitted by transmitter hardware of one transceiver unit in the first group and an observation of the pilot by receiver hardware of another transceiver unit in the second group;

grouping the plurality of processed observations into one or more observation pairs, where each observation pair of the one or more observation pairs comprises: a first observation indicative of a combined response between transmitter hardware of a first transceiver unit in the first group and receiver hardware of a second transceiver unit in the second group, and a second observation indicative of a combined response between transmitter hardware of the second transceiver unit in the second group and receiver hardware of the first transceiver unit in the first group;

calculating, based on a selected set having at least one of the one or more observation pairs, estimates of relative calibration values, where each relative calibration value is associated with a transceiver of each transceiver unit in the first and second groups and is relative with respect to a transceiver of a reference unit, wherein the relative calibration values comprise estimates of relative calibration coefficients between the transceiver of each transceiver unit and the transceiver of the reference unit, and wherein a relative calibration coefficient of one of the transceiver units comprises the ratio of a calibration coefficient of the one transceiver unit over the ratio of a calibration coefficient of the reference unit; and calibrating at least one of the transceiver units in the first group using at least one of the relative calibration values.

39. A method for use in a wireless communication system, the method comprising:

calibrating a plurality of groups of transceiver units based on pilot transmissions and observations of the pilot transmissions within each group, each of the groups of transceiver units having a plurality of transceiver units and is calibrated with respect to a reference unit, wherein calibrating each group of the plurality of groups of transceiver units comprises generating a plurality of processed observations corresponding to pilots transmitted by transceiver units in said each group and observations of the pilots by transceiver units in said each group, wherein each of the pilots is transmitted one at a time, with one of the pilots being transmitted by a distinct one transceiver unit of said each group and being observed by all transceiver units in said each group other than the one transceiver unit, such that transmission of each of the pilots produces at least two observations, wherein at least two pilot transmissions occur in which at least one transceiver unit of the plurality of transceiver units sends a single pilot and at least two observations are received at different transceiver units of the plurality of transceiver units for use in calibration, grouping the plurality of processed observations into one or more observation pairs, and calculating, based on a selected set having at least one of the one or more observation pairs, relative calibration values, where each relative calibration value is associated with a transceiver of each transceiver unit and is relative with respect to a transceiver of a reference unit;

performing inter-calibration of the plurality of groups by calibrating reference units of the plurality of groups relative to one reference unit in one of the plurality of groups.

40. A method of signaling for jointly calibrating transceiver units in two base stations, each transceiver unit including an antenna element, for joint transmission from a set of base stations, which include the two base stations, to at least one other wireless entity, the method comprising:

transmitting at least one pilot from at least one transceiver unit of the first base station as part of a first transmission round, and receiving observations from at least two one transceiver units of the second base station, such that transmission of each pilot of each transceiver unit of the first base station produces at least two observations;

transmitting, as part of a second transmission round, at least one pilot from at least one transceiver unit from the set of transceiver units in the second base-station which received observations in response to the at least one pilot transmitted as part of the first transmission and receiving observations from at least two transceiver units of the first base station, such that transmission of each pilot of each transceiver unit of the second base station produces observations wherein at least two pilot transmissions occur in which at least one transceiver unit of the transceiver units sends a single pilot and at least two observations are received at different transceivers of the plurality of transceiver units for use in calibration;

sending observations from the at least one transceiver unit in the first base station to each transceiver unit of the second base station in response to the pilots transmitted from said each transceiver unit of the second base station, the at least one transceiver unit in the first base station having transmitted the at least one pilot in the first transmission round.

41. The method defined in claim 40 further comprising:
using observation pairs created from the one or more observations from the at least one other transceiver unit in the first base station to obtain estimates of relative calibration values for transceiver units in the first and second base stations.

42. The method defined in claim 40 wherein the relative calibration values are relative to a reference unit.

43. The method in claim 40 further comprising:
generate a plurality of processed pilot observations, each processed pilot observation being indicative of either a combined response between transmitter hardware of one transceiver unit at the first base station and receiver hardware of the at least one transceiver unit at the second base station or a combined response between transmitter hardware of one transceiver unit at the second base station and receiver hardware of the at least one transceiver unit at the first base station;

grouping processed observations into observation pairs, each pair comprising an observation indicative of the combined response between the transmitter hardware of a first unit in the first base station and the receiver hardware of a second unit in the second base station, and an observation indicative of the combined response between the transmitter hardware of the second unit in the second base station and the receiver hardware of the first unit in the first base station;

using the observation pairs to obtain estimates of relative calibration values between the transceiver of each the unit in the first and second base stations, and the transceiver of a reference unit.

44. The method defined in claim 1 wherein each transceiver unit of the plurality of transceiver units sends a single pilot and observations received at all the other transceivers of the plurality of transceiver units are collected and used for calibration.

45. The base station defined in claim 10 wherein each transceiver unit of the plurality of transceiver units sends a single pilot and observations received at all the other transceivers of the plurality of transceiver units are collected and used for calibration.

46. The method defined in claim 20 wherein each transceiver unit of the plurality of transceiver units sends a single pilot and observations received at all the other transceivers of the plurality of transceiver units are collected and used for calibration.

47. The communication system defined in claim 31 wherein each transceiver unit of the plurality of transceiver units sends a single pilot and observations received at all the other transceivers of the plurality of transceiver units are collected and used for calibration.

* * * * *